(12) United States Patent
Mazur et al.

(10) Patent No.: US 9,470,956 B2
(45) Date of Patent: Oct. 18, 2016

(54) DIRECT ENTANGLED TRIPLET-PHOTON SOURCES AND METHODS FOR THEIR DESIGN AND FABRICATION

(71) Applicant: President And Fellows of Harvard College, Cambridge, MA (US)

(72) Inventors: Eric Mazur, Concord, MA (US); Christopher Courtney Evans, Ithaca, NY (US); Michael Gerhard Moebius, Somerville, MA (US); Orad Reshef, Cambridge, MA (US); Sarah E. Griesse-Nascimento, Cambridge, MA (US)

(73) Assignee: President And Fellows Of Harvard College, Cambridge, MA (US)

( * ) Notice: Subject to any disclaimer, the term of this patent is extended or adjusted under 35 U.S.C. 154(b) by 0 days.

(21) Appl. No.: 14/529,906

(22) Filed: Oct. 31, 2014

(65) Prior Publication Data
US 2015/0117826 A1    Apr. 30, 2015

Related U.S. Application Data

(60) Provisional application No. 61/898,190, filed on Oct. 31, 2013.

(51) Int. Cl.
| | |
|---|---|
| *G02F 1/295* | (2006.01) |
| *G02B 6/00* | (2006.01) |
| *G02F 1/35* | (2006.01) |
| *G02F 1/39* | (2006.01) |
| *G02F 1/355* | (2006.01) |
| *G02F 1/365* | (2006.01) |
| *H04B 10/70* | (2013.01) |

(52) U.S. Cl.
CPC .............. *G02F 1/353* (2013.01); *G02F 1/3501* (2013.01); *G02F 1/355* (2013.01); *G02F 1/3544* (2013.01); *G02F 1/365* (2013.01); *G02F 1/395* (2013.01); *G02F 1/3536* (2013.01); *G02F 2001/354* (2013.01); *G02F 2001/3542* (2013.01); *G02F 2202/36* (2013.01); *H04B 10/70* (2013.01)

(58) Field of Classification Search
CPC ...... G02F 1/353; G02F 1/395; G02F 1/3536; G02F 1/3544; G02F 1/355; G02F 1/365; G02F 2001/354; G02F 2001/3542
USPC ...................... 385/5, 122; 359/326, 328–330
See application file for complete search history.

(56) References Cited

PUBLICATIONS

"Third order frequency generation in TiO2 rutile and KTiOPO4" by Gravier et al, Optical Materials, vol. 30, pp. 33-36, 2007.*
"Spectral properties of three-photon entangled states generated via three-photon parametric down-conversion in a x(3) medium" by Chekhova et al, Physical Review, A 72, pp. 023818-1 through 023818-8, 2005.*
Bencheikh Kamel et al. "Triple Photons: A Challenge in Nonlinear and Quantum Optics", Comptes Rendus Physique, 8, pp. 206-220 (2007).
Bennett, Charles H. et al. "Quantum Information and Computation", Nature, vol. 404, pp. 247-255, (Mar. 16, 2000).

(Continued)

*Primary Examiner* — Robert Tavlykaev
(74) *Attorney, Agent, or Firm* — Reza Mollaaghababa; Thomas Engellenner; Pepper Hamilton LLP

(57) ABSTRACT

The present teachings are generally directed to devices and methods for triplet photons generations, and in particular to on-chip integrated sources for generating direct triplet entangled photons.

13 Claims, 23 Drawing Sheets

(56) References Cited

PUBLICATIONS

Bradley, Jonathan D.B. et al. "Submicrometer-Wide Amorphous and Polycrystalline Anatase TiO2 Waveguides for Microphotonic Devices", Optics Express, vol. 20, No. 21, pp. 23821-23831 (Oct. 8, 2012).

Choy, Jennifer T. et al. "Integrated TiO2 Resonators for Visible Photonics", Optics Letters, vol. 37, No. 4, pp. 539-541, (Feb. 15, 2012).

Corona Maria et al. "Third-Oder Spontaneous Paramertic Down-Converson in Thin Optical Fiber as a Photon-Triplet Source", Physical Review A, 84, pp. 033823-01-033823-13 (2011).

Corona, Maria et al. "Experimental Proposal for the Generation of Entangled Photon Triplets by Third-Order Spontaneous Parametric Downconversion in Optical Fibers", Optics Letters, vol. 36, No. 2, pp. 190-192 (Jan. 15, 2011).

Evans Chrsopher C. et al. "Mixed Two-and Three-Photon Absorton in Bulk Rutile(TiO2) Around 800 nm", Optics Express, vol. 20, No. 3, pp. 3118-3128, (Jan. 30, 2012).

Evans, Christopher C. et al. "Multimode Phase-Matched Third-Harmonic Generaiton in Sub-Micrometer-Wide Anatase TiO2 Waveguides", Manuscript Under Preparation.

Foster, M.A. et al. "Optimal Waveguide Dimensions for Nonlinear Interactions", Optics Express, vol. 12, No. 13, pp. 2880-2887, (Jun. 28, 2004).

Foster, Mark A. et al. "Nonlinear Optics in Photonic Nanowires", Optics Express, vol. 16, No. 2, pp. 1300-1320, (Jan. 21, 2008).

Greenberger, Daniel M. et al. "Bells' Theorem Without Inequalities"Am. J. Phys. 58, pp. 1131-1143, (Dec. 1990).

Herzog, T.J. et al. "Frustrated Two-Photon Creation Via Interference", Physical Review Letters, vol. 72, No. 5, pp. 629-632 (Jan. 31, 1994).

Hillery, Mark et al. "Quantum Secret Sharing", Physical Review A, vol. 59, No. 3, pp. 1829-1834, (Mar. 1999).

Hubel, H. et al. "Direct Generation of Photon Triplets Using Cascaded Photon-Pair Sources", Nature 466 (2010).

Lee, Timothy et al. "Resonantly Enhanced Third Harmonic Generation in Microfiber Loop Resonators" J. Opt. Soc. Am. B, vol. 30, No. 3, pp. 505-511 (Mar. 2013).

Levy, Jacob S. et al. "Harmonic Generation in Silicon Nitride Ring Resonators" Optics Express, vol. 19, No. 12, pp. 11415-11421 (Jun. 6, 2011).

Martin, N. et al. "Characterizations of Titanium Oxide Films Prepared by Radio Frequency Magnetron Sputtering" Thin Solid Films 287, pp. 154-163 (1996).

Martin, Nicolas et al. "Miscrostructure Modification of Amorphous Titanium Oxide Thin Films During Annealing Treatment", Thin Solid Films 300, pp. 113-121 (1997).

Jeronimo-Moreno, Y. et al. "Theory of Cavity-Enhanced Spontaneous Parametric Downconversion", Laser Physics Rev, vol. 20, No. pp. 1221-1233 (2010).

Najafi, F. et al. "Membrane-Integrated Superconducting Nanowire Single-Photon Detectors", CLEO (2013).

Richard, S. et al. "Semiclassical Model of Triple Photons Generation in Optical Fibers" Optics Letters, vol, 36, No. 15, pp. 3000-3002 (Aug. 1, 2011).

Shalm, L. K., et al. "Three-Photon Energy-Time Entanglement" Nature Physics, 9, doi:10.1038, pp. 1-4 (Nov. 2012).

Tanzilii, S. et al. "Highly Efficient Photon-Pair Source Using a Periodically Poled Lithium Niobate Wayeguide". Electronics Letters 37, pp. 26-28 (2001).

Yan, Li et al. "Bragg-Grating-Enhanced Narrowband Spontaneous Parametric Downconversion", Optics Express Vo, 18, No. 6, pp. 5957-5963 (Mar. 15, 2010).

Yang, Zhenshan et al. "Enhanced Second-Harmonic Generation in AlGaAs Microring Resonators", Optics Letters, vol. 32, No. 7, pp. 826-828 (Apr. 1, 2007).

Bi, Zhuan-Fang et al. "High-Efficiency Second-Harmonic Generation in Doubly-Resonant x(2) Microring Resonators", Optics Express vol. 20, No. 7, pp. 7526-7543 (Mar. 26, 2012).

Bradley, Jonathan, D.B. et al. "Submicrometer-Wide Amorphous and Polycrystalline Anatase TiO2 Waveguides for Microphotonic Devices" Optics Express, vol. 20, No. 21, pp. 23821-23831, Oct. 8, 2012.

Shalm, L.K., et al. "Three-Photon Energy-Time Entanglement", Nature Physics—Letters, DOI: 10.1038/NPHYS2492, pp. 1-4; Nov. 25, 2012.

Loock, Peter Van et al. "Detecting Genuine Multipartite Continuous-Variable Entanglement" The American Physical Society—Physical Review A 67, pp. 052315-1-052315-13 (2003).

Choy, Jennifer T. et al. "Integrated TiO2 Resonators for Visible Photonics", Optical Society of America, Optics Letters; vol. 37, No. 4, pp. 539-541 Feb. 15, 2012.

Evans, Christopher C. et al. "Spectral Broadening in Anatase Titanium Dioxide Waveguides at Telecommunication and Near-Visible Wavelengths", Optics Express, vol. 21, No. 15, pp. 18582-18591 Jul. 29, 2013.

Bencheikh, Kamel et al. "Triple Photons: A Challenge in Nonlinear and Quantum Optics", C.R. Physique 8 pp. 206-220 (2007).

Richard, S. et al. "Semiclassical Model of Triple Photons Generation in Optical Fibers", Optical Society of America—Optics Letters, vol. 36, No. 15, pp. 3000-3002 Aug. 1, 2011.

Eisaman, M.D. et al. "Invited Review Article: Single-Photon Sources and Detectors", Review of Scientific Instruments (AIP); Rev. Sci. Instrum. 82, pp. 071101-071101-25 (2011).

Ladd, T.D. et al. "Quantum Computers" Nature—Reviews, vol. 46414, pp. 45-53 (Mar. 2010).

Evans, Christopher C. et al. "Mixed Two-and Three-Photon Absorption in Bulk Rutile (TiO2) Around 800 NM", Optics Express, vol. 20, No. 3, pp. 3118-3128, Jan. 30, 2012.

Evans, Christopher C. et al. "Multimode Phase-Matched Third-Harmonic Generation in Sub-Micrometer-Wide Anatase TiO2 Wavguides", Optics Express, vol. 23, No. 6, pp. 7832-7841, Mar. 23, 2015.

Moimer, Klaus "Monte Carlo Wave-Function Method in Quantum Optics", J. Opt. Soc. Am. B/vol. 10, No. 3, pp. 524-538 (Mar. 1993).

Sheik-Bahae, M. et al. "Dispersion and Band-Gap Scaling of the Electronic Kerr Effect in Solids Associated With Two-Photon Absorption" The American Physical Society, Physical Review Letters, vol. 65, No. 1, pp. 96-99, Jul. 2, 1990.

Rayner, M.G. et al. "Entangled Photon-Pair Two-Dimensional Fluorsecence Spectroscopy (EPP-2DFS)", American Chemical Society, J. Phys. Chem. B 117, pp. 15559-15575 (2013).

Yuan, Zhen-Sheng et al. "Entangled Photons and Quantum Communication" Physics Reports, 497 pp. 1-40 (2010).

Soljacic, Marin and JOannopoulos, J.D. "Enhancement of Nonlinear Effects Using Photonic Crystals", Nature Publishing Group—Nature Materials, VCol. 3, pp. 211-219 (Apr. 2004).

Reshef, Orad et al. "Polycrystalline Anatase Titanium Dioxide Microring Resonators With Negative Thermo-Optic Coefficient", Journal of the Optical Society of America B, vol. 32, No. 11, pp. 2288-2293 (Nov. 2015).

Bufetov, I.A. et al. "Ultraviolet-Light Generation in Nitrogen-Doped Silica Fiber", Optical Society of America—Optical Letters, vol. 22, No. 18 pp. 1394-1396, Sep. 15, 1997.

Corona, Maria et al. "Third-Order Spontaneous Parametric Down-Conversion in Thin Optical Fibers as a Photon-Triplet Source", American Physical Society—Physical Review A, 84, pp. 033823-1-033823-13 (2011).

Lee, Timothy et al. "Resonantly Enhanced Third Harmonic Generation in Microfiber Loop Resonators", J. Opt. Soc. Am. B, vol. 30, No. 3 pp. 505-511 (Mar. 2013).

Plenio, M.B. and Knight, P.L. "The Quantum-Jump Approach to Dissipative Dynamics in Quantum Optics", Reviews of Modern Physics, vol. 70, No. 1, (Jan. 1998).

Chekhova, M.V. and Ivanova, O.A. "Spectral Properties of Three-Photon Entangled States Generated Via Three-Photon Parametric Down-Conversion IN A X(3) Medium" The Amercian Physical Society—Physical Review A, 72, pp. 23818-1 023818-8 (2005).

(56) References Cited

OTHER PUBLICATIONS

Taylor, Michael A. et al. "Biological Measurement Beyond the Quantum Limit" Nature Photonics, vol. 7, pp. 229-233 (Mar. 2013).
Krapick, Stephan and Silberhom, Christine "Analysis of Photon Triplet Generation In Pulsed Cascaded Parametric Down-Conversion Sources", arXiv:1506.07655v1 [quant-ph] pp. 1-12 (Jun. 25, 2015).
Dousse, Adrien et al. "Ultrabright Source of Entangled Photon Pairs" Nature—vol. 466 pp. 217-220, Jul. 8, 2010.
Shih, Yanhua "Entangled Biphoton Source—Property and Preparation", Rep. Prog. Phys. 66, pp. 1009 1044 (2003).
Lugiato, L.A. et al. "Quantum Imaging" arXiv:quant-ph/0203046v1, pp. 1-27 (Mar. 11, 2002).
Zhu, Zhaoming and Brown, G. Thomas "Full-Vectorial Finite-Difference Analysis of Microstructured Optical Fibers" optics Express, vol. 10, No. 17, pp. 853-864, Aug. 26, 2002.
Das, Susanta Kumar et al. "Highly Efficient THG in TiO2 Nanolayers for Third-Order Pulse Characterization" Optics Express, vol. 19, No. 18, pp. 16985-16995, Aug. 29, 2011.
Felbinger, Timo et al. "Oscillation and Generation of Nonclassical States in Three-Photon Down-Conversion" The American Pysical Society, Physical Review Letters, vol. 80, No. 3, pp. 492-495, Jan. 19, 1998.
Corcoran, B. et al. "Green Light Emission in Silicon Through Slow-Light Enhanced Third-Harmonic Generation in Photonic-crystal Waveguides", Nature Photonics, vol. 3, pp. 206-210, (2009).
Giovannetti, Vittorio et al. "ADvances in Quantum Metrology", Nature Photonics, vol. 5, (Apr. 2011).
Coelho, A.S. et al. "Three-Color Entanglement", Science, vol. 326 pp. 823-826, Nov. 6, 2009.
Lin, Q. et al. "Photon-Pair Generation in Optical Fibers Through Four-Wave Mixing: Role of Raman Scattering and Pump Polarization", The American Physical Society, Physical Review A, 75, pp. 023803-1023803-19 (2007).
Evans, C. Christopher et al. "Low-Loss Titanium Dioxide Waveguides and Resonators Using a Dielectric Lift-Off Fabrication Process" Optics Express, vol. 23, No. 9, pp. 11160-11168, Apr. 21, 2015.
Watanabe, Yutchi et al. "Measurement of nonlinear Absorption and Refraction in Titanium Dioxide Single Crystal by Using a Phase Distortion Method" Applied Physics Letters, vol. 66, No. 25, pp. 3431-3432 Jun. 19, 1995.
O'Brien L. Jeremy et al. "Photonic Quantum Technologies", Nature Photonics, vol. 3, pp. 687-695 (2009).
Hong, C.K. and Mandel, L. "Theory of Parametric Frequency Down Conversion of Light", Physical Review A, vol. 31, No. 4, pp. 2409-2418 (Apr. 1985).
Dell'Anno, F. et al. "Continuous-Variable Quantum Teleportation With Non-Gaussian Resources", The American 3hysical Society—Physical Review A, 76, pp. 022301-1-022301-11 (2007).
Preston, Kyle et al. "Polysilicon Photonioc Resonators for Large-Scale 3D Integration of Optical Networks", Optics Express, vol. 15, No. 25 pp. 17283-17290, Dec. 10, 2007.
Helt, L.G. and Steel, M.J. "Spontaneous Parametric Downconversion In Waveguides: What's Loss Got to Do With It?", arXiv:1407.4219v1 [quant-ph], pp. 1-13, Jul. 16, 2014.
Hubel et al. "Direct Generation of Photon Triplets Using Cascaded Photon-Pair Source", Supplementary Information; doi:10.1038/nature 09175, pp. 601-603 Jul. 29, 2010.

\* cited by examiner

DIRECT ENTANGLED TRIPLET-PHOTON SOURCES AND METHODS FOR THEIR DESIGN AND FABRICATION

CROSS-REFERENCE TO RELATED APPLICATION

This application claims the benefit of priority of U.S. Provisional Application No. 61/898,190 filed Oct. 31, 2013, which is hereby incorporated by reference in its entirety.

FEDERALLY SPONSORED RESEARCH

This invention was made with Government support under grants ECCS-1201976 and ECCS-0901469 awarded by National Science Foundation (NSF). The Government has certain rights in the invention.

BACKGROUND

The present teachings are generally directed to devices and methods for triplet photons generation, and in particular to on-chip integrated sources for generating direct triplet entangled photons.

An efficient triplet-photon source can have a variety of applications ranging from ground-breaking experiments in quantum optics to strict tests of quantum theory to revolutionary applications in secure quantum communication and computation. Quantum entanglement, where multiple particles share a joined quantum state, is the basis for many of these applications. Secure two-party quantum communication links using optical fiber ($\lambda$=1550 nm) have recently been commercialized using pairs of entangled photons. The challenge for realizing a multiparty quantum network is to entangle three or more photons, including the ability to form a Greenberger-Horne-Zeilinger (GHZ) state.

The production of direct triplet photons has, however, proven to be exceedingly difficult. Although there are different ways to entangle photons (e.g., using post-selection methods), direct triplet photons production differs in that the photon triplets originate from the same original photon and are generated in the same event.

Current methods for triplet photons generation have primarily focused on adapting very low efficiency pair sources. For example, in one process known as cascaded spontaneous parametric down-conversion (C-SPDC), a single photon splits into two photons through (SPDC) and one of those photons splits a second time, forming a triplet. SPDC can achieve conversion efficiencies in the range of $10^{-9}$-$10^{-6}$ ($10^{-18}$-$10^{-12}$ for cascaded SPDC). Direct triplet production through a $\chi^{(3)}$ process commonly known as third-order spontaneous parametric down-conversion (TOSPDC), whereby one photon is annihilated to produce a photon triplet, is less explored due to extraordinarily low efficiency in bulk materials due to low $\chi^{(3)}$ non-linearity, poor confinement, and difficulties achieving sustained phase matching between disparate wavelengths.

Accordingly, there is a need for enhanced sources and methods for generating triplet photons.

SUMMARY

In one aspect, a device for generating triplet photons is disclosed, which comprises a substrate exhibiting a linear refractive index equal to or less than about 1.6 for at least one radiation wavelength, and a waveguide disposed on said substrate and adapted to receive laser radiation at that wavelength from a pump source. The waveguide exhibits a linear refractive index equal to or greater than about 1.8 and a non-linear refractive index equal to or greater than about $1\times10^{-19}$ m$^2$/W at that radiation wavelength. The waveguide can have a maximum cross-sectional dimension in a range of about 100 nm to about 2000 nm, e.g., in a range of about 100 nm to about 1000 nm, and a length in a range from about 10 microns to about 10 centimeters. In some embodiments, the waveguide and the substrate exhibit the aforementioned linear and nonlinear refractive indices over a range of wavelengths, which includes the pump wavelength and the wavelength(s) of triplet photons generated via nonlinear interaction of the pump photons with the material forming the waveguide.

In some embodiments, the waveguide is disposed between a top cladding and the aforementioned substrate. While in some implementations, the substrate and the top cladding are formed of the same material, in other embodiments, they can be formed of different materials. In some embodiments, the device for generating triplet photons may not include a top cladding.

In some embodiments, the waveguide can have a non-circular cross-section, e.g., a rectangular, trapezoidal or square cross-section. In some such embodiments, the waveguide includes a bottom surface that is in contact with the underlying substrate and a top surface that is in contact with a top cladding.

The waveguide can be configured to provide phase matching between at least one mode suitable for propagating said pump radiation and at least one mode suitable for propagating direct triplet entangled photons (herein also referred to as signal photons) generated via nonlinear interaction of the pump radiation with the waveguide. For example, as discussed in more detail below, the material forming the waveguide and the underlying substrate as well as the geometry and dimensions of the waveguide can be selected to obtain such phase matching. By way of example, in some implementations, the waveguide can have a thickness in a range of about 100 nm to about 2000 nm and a width in a range of about 100 nm to about 2000 nm.

In some embodiments, the waveguide is a multi-mode waveguide that is configured to provide a plurality of modes for propagation of the pump laser radiation. In some such embodiments, the waveguide is configured to provide phase matching between a higher propagating mode of the pump radiation (i.e., a mode higher than the fundamental TE and/or TM propagating modes) and at least one mode suitable for the propagation of direct triplet entangled photons generated via nonlinear interaction of the pump radiation with the waveguide. The waveguide may also be configured such that there is a strong overlap between the modes, leading to a large effective nonlinearity. By way of example, the waveguide can be dimensioned, e.g., by selecting its thickness and width, such that the spatial overlap between the pump mode and at least one phase-matched mode of propagating direct triplet entangled photons as defined by Equation (12) and as represented by the nonlinear coefficient in Equation (4) is greater than about 20/W/km. In other embodiments, the nonlinear coefficient may be greater than about 40/W/km, or greater than about 100/W/km, or greater than about 200/W/km, e.g., about 250/W/km.

In some embodiments, the waveguide is substantially transparent to both the pump and signal radiation wavelengths. By way of example, in some embodiments, the waveguide is substantially transparent to radiation having a wavelength in a range of about 400 nm to about 2000 nm.

Some suitable materials for forming the waveguide include, without limitation, $TiO_2$, silicon nitride, diamond and silicon carbide. Some suitable materials for forming the substrate and/or the top cladding can include, without limitation, silica, quartz, $MgF_2$, sapphire, aluminum oxide ($Al_2O_3$), zinc oxide (ZnO), SU-8, and cytop. In some embodiments, low-loss, lattice-matched single crystal rutile on sapphire films may be used to form the waveguide.

In a related aspect, a device for generating direct entangled triplet photons is disclosed, which comprises a waveguide extending from a proximal end adapted to receive laser radiation from a pump source to a distal end. The waveguide can support a plurality of propagating modes, e.g., in the visible and the infrared regions of the electromagnetic spectrum. In some embodiments, the waveguide can exhibit a linear index of refraction equal to or greater than about 1.8 and a non-linear refractive index equal to or greater than about $1 \times 10^{-19}$ m$^2$/W, where the waveguide is configured to allow the generation of direct entangled triplet photons via nonlinear interaction of said pump radiation at a triplet production rate of at least about 10 triplets/second (e.g., in a range of about 10 to about $10^6$ triplets/second or in a range of about 1000 to about $10^6$ triplets/second). In some embodiments, a cladding may be disposed on at least a portion of an external surface of the waveguide, where the cladding exhibits a linear index of refraction of equal to or less than about 1.6. The waveguide can have a maximum cross-sectional dimension in a range of about 100 nm to about 2000 nm, e.g., in a range of about 100 nm to about 1000 nm, and a length greater than about 10 micrometers (microns). In one example, the length may be in a range from about 10 microns to about 10 centimeters. In some embodiments, the waveguide and the cladding exhibit the aforementioned linear and nonlinear refractive indices over a range of wavelengths that encompasses the pump and the signal wavelengths.

In another aspect, a method of generating direct entangled triplet photons is disclosed, which comprises providing a waveguide disposed on a substrate, where the waveguide exhibits a linear index of refraction equal to or greater than about 1.8 and a non-linear refractive index equal to or greater than about $1 \times 10^{-19}$ m$^2$/W, said waveguide being configured to provide phase matching and high modal overlap so as to enhance effective nonlinearity between at least one propagating mode of a pump laser radiation and at least one propagating mode suitable for direct entangled triplet photons generated via nonlinear interaction of the pump radiation with the waveguide, and introducing the pump laser radiation into the waveguide at a sufficient power so as to effect the generation of direct entangled triplet photons via third-order nonlinear interaction of the pump photons with the waveguide, e.g., at a sufficient high rate, e.g., at a rate of at least 10 triplets/second. By way of example, the power of said pump laser radiation can be in a range of about 4 μW (microwatts) to about 20 W (watt). In embodiments in which pulsed light is employed, relevant pulse energies can be obtained by the probability that a triplet is formed during each pulse. By way of example, for a given device with a $10^{-12}$ conversion efficiency ($P_{prob}$) and a pump wavelength ($\lambda$) (e.g., 500 nm), the probability that each pulse generates a triplet requires a pulse energy of $E_{pulse} = P_{prob} hc/(\lambda)$, where h is Planck's constant and c is the speed of light. In this case, operating with a pulse energy of 400 nJ represents a practical pulse energy whereby one triplet is generated for each pulse, on average. The total number of triplets per second will be given by the repetition rate of the pulsed pump light source.

In another aspect, a device for generating direct entangled triplet photons is disclosed, which comprises a waveguide having an input port for receiving a pump laser radiation, and a resonant cavity optically coupled to said waveguide for receiving at least a portion of the pump laser radiation propagating through the waveguide. The resonant cavity is configured to allow generation of direct triplet entangled photons (herein also referred to as signal photons or signal radiation) via nonlinear interaction of the pump radiation with the material forming the resonant cavity. Some examples of suitable resonant cavities include ring resonators, spheres, discs, and photonic crystal cavities, among others. At least a portion of the triplet photons can be coupled out of the resonator cavity into the waveguide and exit the waveguide via an output port thereof. In some embodiments, the resonant cavity comprises a ring resonator formed on a waveguide, e.g., a ring waveguide, that exhibits a linear refractive index equal to or greater than about 1.8, and a nonlinear refractive index equal to or greater than about $1 \times 10^{-19}$ m$^2$/W at least at the pump and signal wavelengths. The ring waveguide is preferably substantially transparent to the pump and signal wavelengths. The waveguide and the ring resonator can be disposed on an underlying substrate, and further, in some implementations between an underlying substrate and a top cladding layer. In some cases, the underlying substrate and/or the top cladding can exhibit a linear refractive index equal to or less than about 1.6.

In another aspect, a method of designing a device for generating direct entangled triplet photons is disclosed. The method comprises modeling a waveguide adapted to support at least one propagating visible radiation mode and at least one propagating infrared radiation mode, calculating wavelength dispersion characteristics of said at least one visible and said at least one infrared mode for a plurality of different values of selected geometric dimensions of said waveguide, and determining based on said calculated dispersion characteristics whether there is a phase matching condition between said at least one visible and said at least one infrared mode for one or more of said values of the geometric dimensions of said waveguide. In some embodiments, said geometric dimensions can be any of a thickness, a width, etch fraction and side wall angle of said waveguide. In some embodiments, the method further comprises calculating spatial modal overlap between said at least one visible and said at least one infrared mode in a model of said waveguide dimensioned such that said modes exhibit phase matching condition.

In another aspect, a device for generating direct entangled triplet photons is disclosed, comprising a waveguide configured to support at least one propagating visible radiation mode and at least one propagating infrared radiation mode, the waveguide having one or more dimensions configured to achieve a phase matching condition between said at least one propagating visible radiation mode and said at least one propagating infrared radiation mode. In some embodiments, the one or more dimensions of said waveguide are further configured to achieve modal overlap between said at least one propagating visible radiation mode and said at least one propagating infrared radiation mode. In some embodiments, the modal overlap of said at least one propagating visible radiation mode and said at least one propagating infrared radiation mode be characterized by a nonlinear coefficient of at least about 90/W/km, or at least about 100/W/km, or at least about 200/W/km, e.g., about 250/W/km. In various embodiments disclosed herein, the waveguide can comprise TiO$_2$. In some embodiments, the modal overlap is characterized by a nonlinear coefficient greater than at least about 20/W/km.

Further understanding of various aspects of the invention can be obtained by reference to the following detailed description in conjunction with the associated drawings, which are described briefly below.

DETAILED DESCRIPTION

Figure 1:
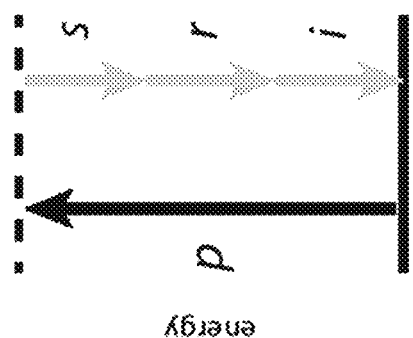
FIG. 1 schematically depicts energy diagram for third-order spontaneous parametric down-conversion. In this process a single pump photon spontaneously splits into three signal photons by way of a virtual state (dashed line).

In some aspects, the present invention is directed to efficient triplet-photon sources that utilize a high index, highly nonlinear waveguide that is integrated on-chip. It is expected that in some embodiments the triplet generation rate of devices according to the present teachings will be up to four or six orders of magnitude greater than the rates achieved by current methods. The high triplet production rate and customizable spectral properties unique to integrated sources according to the present teachings enable the first practical direct triplet source for quantum information applications. As discussed in more detail below, the use of an integrated waveguide in many embodiments for generating triplet photons according to the present teachings provides robust, scalable, and commercializable photon sources for many emerging applications in quantum information.

In some embodiments, a triplet photon source according to the present teachings includes an integrated (on-chip) waveguide that is designed to enhance spontaneous splitting of pump photons via TOSPDC (Third Order SPDC). When pump photons (e.g., with a wavelength of 500 nm) enter into the waveguide, the combination of photon energy, materials, and geometry of the waveguide can greatly enhance the probability that a pump photon would spontaneously split into three entangled signal photons forming a triplet (e.g., three photons each with a wavelength of 1500 nm). Further, in some embodiments, using the design criteria discussed herein, the signal photons can be generated in different propagating modes, as well as at different wavelengths. Subsequently, these signal photons can be routed to different output ports, if desired. These three signal photons share correlations (i.e. exhibit entanglement). For example, the total energy of the three signal photons must equal the energy of the pump photon and the three-photons must be created simultaneously. Such correlations are the cornerstone of quantum information applications including quantum communication, quantum cryptography, and quantum computing.

The term "modal overlap" as used herein refers to a spatial overlap of two propagating modes within a waveguide, defined by Equation (12) below. The term "high modal overlap" as used herein refers to a modal overlap that can lead to a nonlinear coefficient greater than at least about 20/W/km.

An integrated triplet-photon source according to the present teachings can be a key resource for commercial quantum information applications and for performing many fundamental experiments in quantum optics. The ultra-secure-communications industry utilizes entangled photon pairs to transmit encryption keys and detect potential eavesdroppers over a secure quantum link. An ideal pair source should be either "on-demand" or have a "heralding" photon (an auxiliary photon that is time-correlated with the pair). These sources can reduce background noise by allowing the user to arm their single-photon detectors only when the photon pair is expected to arrive. In some embodiments, the triplet sources according to the present teachings can act as a heralded pair source, producing a pair of photons with a spectrally separated heralding photon. In addition, a triplet-photon source according to the present teachings can be a key component of a multi-party secure quantum network. Further, triplet photons sources according to the present teachings can be used in photonics-based quantum computers. Further, in some embodiments, the on-chip triplet photons sources according to the present teachings can be directly integrated with other quantum circuit elements.

Theory of TOSPDC

The generation of photon triplets via third-order spontaneous parametric down-conversion (TOSPDC) utilizes the third-order polarization ($\chi^{(3)}$) to generate entangled triplets that may be used for quantum information applications. In this process, a single "pump" photon is spontaneously annihilated and splits into three "signal" photons by way of a virtual state, as shown schematically in FIG. 1.

To differentiate these three photons, they are labeled as signal 1 (s), signal 2 (r), and idler (i). These photons obey energy conservation given by:

$$\hbar\omega_p = \hbar\omega_s + \hbar\omega_r + \hbar\omega_i, \quad (1)$$

where $\hbar\omega_p$ is the energy of the pump photon (with a similar notation for signal photons). Analogous to second harmonic generation, momentum must be conserved for efficient conversion. Using equation 1, momentum conservation is described using:

$$\Delta k_{cw}(\omega_r, \omega_s) = k_p(\omega_p) - k_s(\omega_s) - k_r(\omega_r) - k_i(\omega_p - \omega_s - \omega_r) + \Phi_{NL} \quad (2)$$

where, $\Delta k_{cw}$ is the wavevector mismatch, $k_p(\omega_p)$, $k_s(\omega_s)$, $k_r(\omega_r)$, $k_i(\omega_p - \omega_s - \omega_r)$ are the momentum of the pump, signal (s), signal (r), and idler (i) photons (respectively) within the waveguide, $\omega_i = \omega_p - \omega_s - \omega_r$, and $\Phi_{NL}$ is the nonlinear phase. For a particular frequency, this is related to the effective index, n, through k=ωn/c, where c is the speed of light.

The rate of triplet generation for a continuous wave pump is given by:

$$N_{cw} = \frac{2^2 3^2 \hbar c^3 n_p^3 L^2 \gamma^2 P}{\pi^2 \omega_p^2} \int d\omega_r \int d\omega_s h(\omega_r, \omega_s, \omega_p - \omega_r - \omega_s) \text{sinc}^2\left[\frac{L}{2}\Delta k_{cw}(\omega_r, \omega_s)\right]. \quad (3)$$

In this expression, $\hbar$ is the reduced Planck's constant, c is the speed of light, $n_p$ is the effective refractive index for the pump radiation, L is the length of the device, P is the power, $\omega_p$ is the pump frequency, γ is the nonlinear coefficient, a figure of merit for the strength of the nonlinear process, defined by the following equation, $$\gamma = \frac{3\chi^{(3)}\omega_{p0}}{4\varepsilon_0 c^2 n_p^2 A_{eff}}, \quad (4)$$

and:

$$h(\omega_r, \omega_s, \omega_i) \equiv \frac{k_s' \omega_s}{n_s^2} \frac{k_r' \omega_r}{n_r^2} \frac{k_i' \omega_i}{n_i^2}. \quad (5)$$

For these expressions, $A_{eff}$ is the effective area, defined further below, and k' denotes the first derivative with respect to ω.

The nonlinear phase can be defined as follows:

$$\Phi_{NL} = [\gamma_p - 2(\gamma_{pr} + \gamma_{ps} + \gamma_{pi})]P \quad (6)$$

where each γ is defined according to the above Equation (4) with $\gamma_p$ corresponding to the pump mode and $\gamma_{pr}$, $\gamma_{ps}$, and $\gamma_{pi}$ take into account, respectively, the overlap of the pump mode with the signal (1), signal (2) and the idler photons.

The above theory illustrates that reasonable efficiencies for the production of direct entangled triple photons can be achieved for vanishing values of wavevector mismatch $\Delta k_{cw}$ (i.e., $\Delta k_{cw} \approx 0$), a condition known as "phase matching." The phase matching permits constructive interference of generated photons over long interaction lengths. For common optical materials, the index of refraction is strongly wavelength dependent, being higher at typical pump wavelengths (at visible frequencies) and lower at signal frequencies (at near-infrared frequencies), creating large values of $\Delta k_{cw}$, thus drastically reducing the number of triplet photons that can be generated.

To achieve phase matching, in some embodiments according to the present teachings a waveguide that has a large refractive index contrast between a core and a cladding (e.g., a difference of about 0.2 or greater) can be employed to create a multimode waveguide at the pump (e.g., visible) wavelength. The fundamental transverse-electric-like (TE) and transverse-magnetic-like (TM) modes can extend to signal (e.g., near-infrared) radiation wavelengths, meanwhile there can be several higher-order modes (HOM) at the pump wavelength, which can propagate with the reduced momentum necessary to phase match pump photons to signal photons. As discussed in more detail below, in some embodiments, such higher-order modes of the pump laser radiation are utilized to obtain phase matching for efficient generation of direct entangled triplet photons.

The γ parameter in the above Equation 4 shows that the rate of triplet production depends strongly on the intrinsic $\chi^{(3)}$-nonlinearity of the material in which the triplet photons are generated (herein also referred to as the core material) as well as the effective area $A_{eff}$. In particular, an increase in the intrinsic $\chi^{(3)}$-nonlinearity of the material results in an increase in the triplet photon production rate. Further, an increase in a difference between the refractive optical index of the core material and a cladding material surrounding the core material leads to smaller effective areas, $A_{eff}$, which enhances production rates.

For producing triplet photons in silica fibers ($SiO_2$), the nonlinear coefficient may be about 19/W/km. Various embodiments disclosed herein may utilize $TiO_2$, which has enhanced nonlinearity compared with silica fibers ($\chi^{(3)}$ of TiO2~30×$\chi^{(3)}$ of SiO2) and exhibits stronger light confinement in waveguides due to a higher core/cladding index difference. In one example, this results in about 10 times more confinement. This can lead to an increase in triplet generation of a factor of 1000 in $TiO_2$ waveguides as compared to silica fibers. Therefore, the nonlinear coefficient γ may be used as a figure of merit for the generation of triplet photons in various embodiments disclosed herein. Various embodiments disclosed herein may achieve γ>19/W/km, which exceeds the ideal nonlinearity of $SiO_2$ for this process. In some embodiments configured according to teachings disclosed herein, γ may be greater than about 90/W/km, for example, γ may be about 250/W/km.

Figure 2:
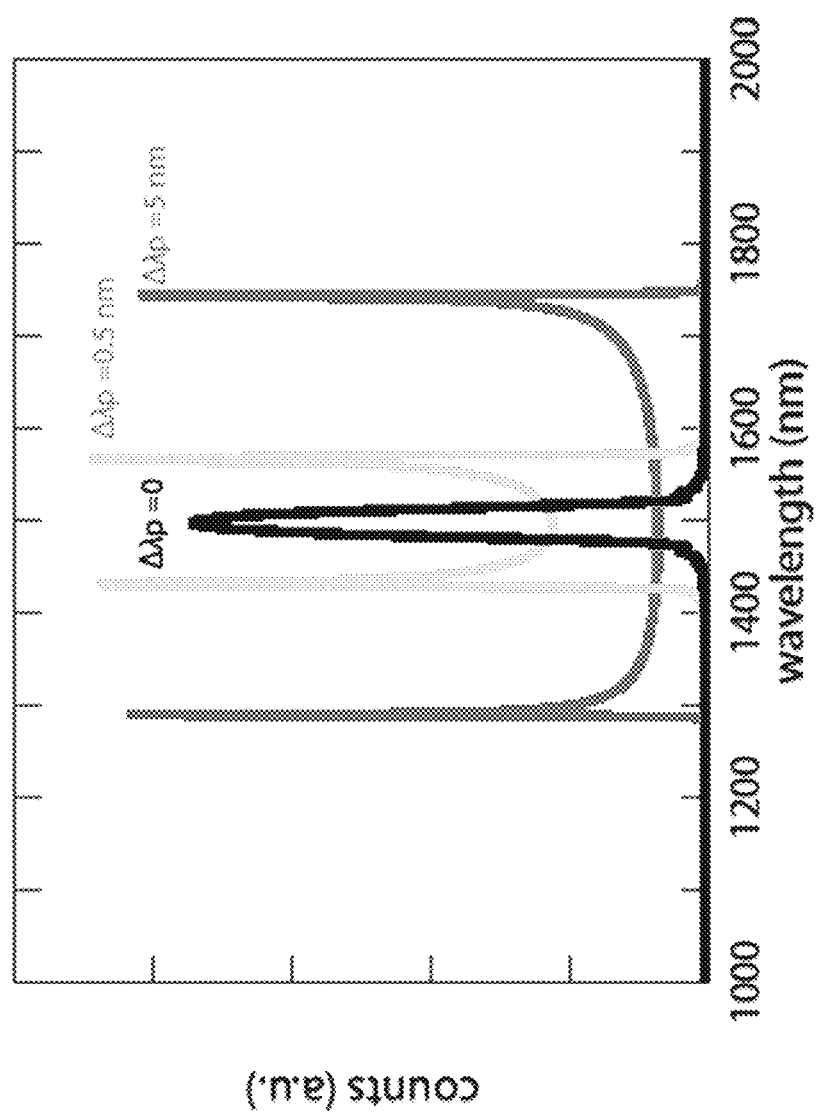
FIG. 2 shows theoretical spontaneous triplet spectra for a representative TiO$_2$ waveguide with a phase match point at 500 nm when pumped with 500 nm light slightly blue shifted from the phase match point.

Applicants have also discovered that the signal-frequency spread can be highly sensitive to small changes in the pump frequency. By way of example, FIG. 2 shows theoretically calculated spectra of spontaneous triplet photons generated in a $TiO_2$ when phase matching conditions are met. These spectra show that a small variation in the wavelength of the pump photons can drastically change the span of wavelengths in the triplet photons signal. This sensitivity of the signal spectrum on the stability of the pump wavelength places strict demands on the stability of the pump wavelength.

The various terms and phrases are herein employed consistent with their ordinary meaning in the art. For additional clarity, the following terms are described below:

The coefficient of absorption of a material can be defined as follows:

$$P(z)=P(0)e^{\alpha z}, \quad \text{Equation (7)}$$

wherein, $\alpha$ denotes the coefficient of absorption (herein also referred to as the absorption coefficient), $P(0)$ denotes input radiation power introduced into the material, $P(z)$ denotes the radiation power after the passage of the radiation through a length (z) of the material. In addition, scattering losses can diminish the power of the pump or signal radiation propagating through a material. The coefficient of scattering loss can be defined in a similar manner as shown in Equation (7).

A material is "substantially transparent" to a radiation wavelength, as used herein, if it exhibits a maximum absorption coefficient, as defined by Equation (7) above, at that wavelength in a range of about 500,000 $m^{-1}$ to 50,000 $m^{-1}$ (about 2000 to about 20000 dB/cm), and preferably an absorption coefficient less than about 50 $m^{-1}$ (2 dB/cm).

The linear refractive index (n) (herein also referred to as linear refractive optical index or linear index of refraction) of a material can be defined as the ratio of the speed of light (c) in vacuum relative to the speed of light in that material (v):

$$n(f) = \frac{c}{v} \quad \text{Equation (8)}$$

The linear refractive index of a material is generally a function of the radiation frequency.

The "nonlinear refractive index" (herein also referred to as the "nonlinear optical refractive index") of a material ($n_2$) is defined as:

$$n_2 = \frac{3\chi^{(3)}}{4n_0\epsilon_0 c} \quad \text{Equation (9)}$$

where, $n_2$ denotes the nonlinear refractive index, $\chi^{(3)}$ is the third-order non-linear optical susceptibility, $n_0$ denotes the linear refractive index, $\epsilon_0$ is the permittivity of free space, and c is the speed of light in vacuum.

The terms "about" and "approximately" are used herein interchangeably and are intended to indicate a variation of at most about +/−5 percent of a numerical value.

Figure 3A:
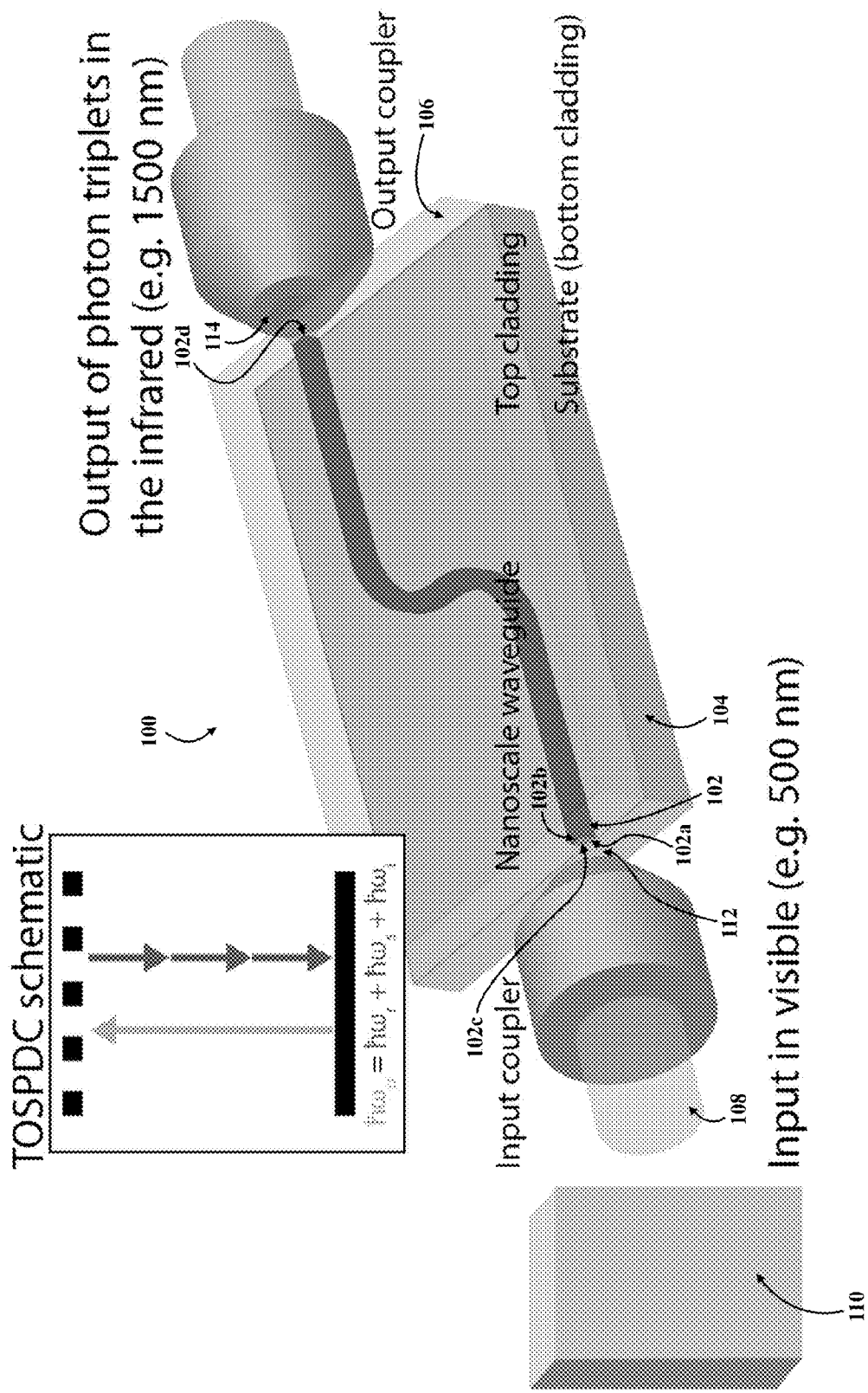
FIGS. 3A, 3B and 3C schematically depict a triplet photon source according to an embodiment of the present teachings.
Figure 3B:
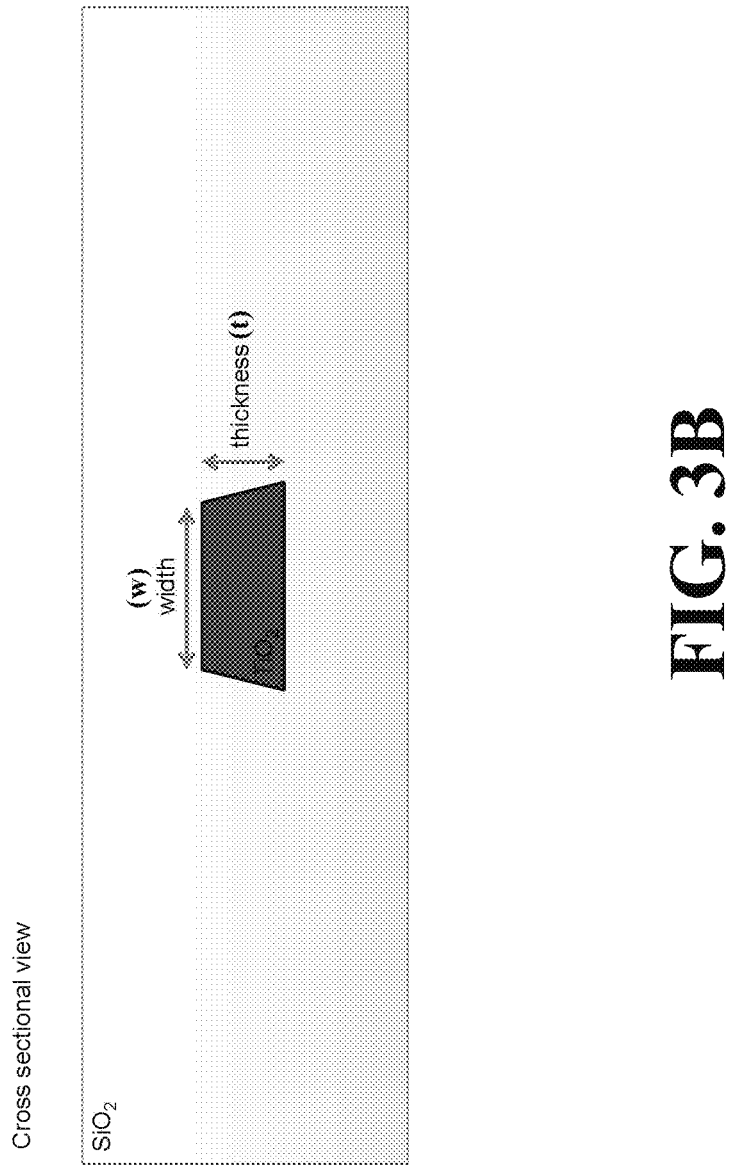
Figure 3C:
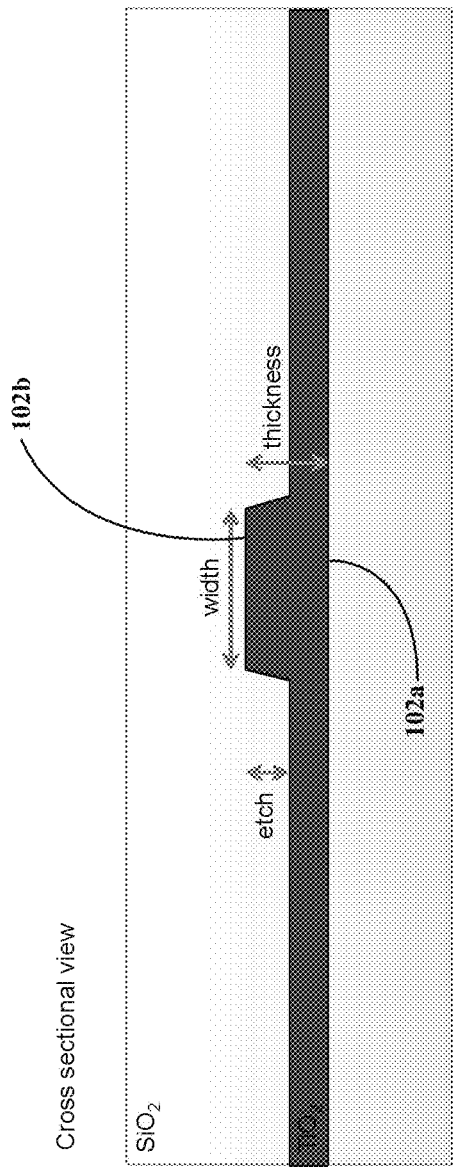

FIGS. 3A, 3B, and 3C schematically depict a device 100 according to an embodiment of the present teachings for generating direct entangled triple photons, which includes a waveguide 102 that is disposed on an underlying substrate 104. In this embodiment, the waveguide 102 has a substantially rectangular (e.g., trapezoidal) cross-sectional profile (in a plane perpendicular to the direction of propagation) and includes a lower surface 102a that is in contact with the substrate 104, and an upper surface 102b over which a top cladding layer 106 is disposed. In this embodiment, the sidewall angle of the waveguide, i.e., the angle between the sidewall of the waveguide and the bottom surface of the waveguide is about 75 degrees, though in other embodiments different sidewall angles can be employed. While in some implementations, the material forming the top cladding 106 is the same as the material forming the substrate, in other implementations, the substrate 104 and the top cladding 106 can comprise different materials. As discussed in more detail below, each of the substrate and the top cladding exhibits an index of refraction that is less than the index of the refraction of the material forming the waveguide.

The waveguide 102 includes a proximal end 102c that is adapted to receive laser radiation (pump photons) 108 from a laser source 110. The laser source 110 can be a continuous or a pulsed source. Some suitable examples of the laser source 110 include, without limitation, laser diodes, thermally-tuned laser diodes, optically pumped solid state lasers, dye lasers, optical parametric amplifiers, optical parametric oscillators, as well as frequency converted versions of these lasers, e.g., doubled via second harmonic generation. In some embodiments, the laser source 110 can generate pump laser radiation with an average power, e.g., in a range of about 1 mW to about 10 W.

In this embodiment, an input coupler 112, e.g., an SU-8 polymer coupling pad, facilitates the introduction of the pump photons into the waveguide 102. The waveguide 102 extends from the proximal end 102c to a distal end 102d through which direct entangled triplet-photons, which are generated via non-linear interaction of the pump photons with the material forming the waveguide 102 as discussed in more detail below, exit the waveguide. In this embodiment, an output coupler 114 (e.g., an SU-8 pad) facilitates the egress of the triplet photons from the waveguide, e.g., into downstream components. In some embodiments, the device 100 may further include one or more photon detectors. For example, the device 100 may include a plurality of superconducting nanowire single photon detectors integrated on chip. For example, as demonstrated by Faraz Najafi et al. "Membrane-integrated superconducting nanowire single-photon detectors" CLEO 2013, which is herein incorporated by reference in its entirety, superconducting nanowire single-photon detectors can be integrated on sub-400-nm-thick silicon nitride membranes, which can then be transferred and aligned to photonic structures on a secondary chip with sub-micron placement accuracy.

The waveguide 102 can be implemented in a variety of different shapes, e.g., S or serpentine shape. Specifically, in this embodiment, the waveguide 102 includes a bend to ensure that the input beam is not aligned with the output face of the waveguide so as to enhance the signal-to-noise ratio.

In this embodiment, the waveguide 102 is formed of a material that exhibits a linear refractive index ($n_{waveguide}$) that is equal to or greater than about 1.8 for at least the wavelength of the pump and signal (i.e., triplet) photons, and preferably over a wavelength range that includes the wavelength of the pump and signal photons. By way of example, the linear refractive index of the waveguide can be greater than about 1.8, e.g., in a range of about 1.8 and 4.2, for wavelengths in a range of about 200 nm to about 2500 nm.

The linear refractive index of the material forming substrate 104 ($n_{substrate}$) is significantly less than the linear refractive index of the waveguide. By way of example, in this embodiment, the linear refractive index of the substrate can be equal to or less than 1.6 for at least the wavelengths of the pump and signal photons, and preferably over a wavelength range in which the linear refractive index of the waveguide is at least about 1.8. By way of example, the linear refractive index of the material forming the substrate can be equal to or less than about 1.6 (e.g., in a range of about 1 to about 1.6) for wavelengths in a range of about 200 nm to about 2000 nm.

Similarly, the linear refractive index of the material forming the top cladding layer 106 can be significantly less than the linear refractive index of the waveguide. For example, the linear refractive index of the top cladding can be equal to or less than about 1.6 for at least the wavelengths of the pump and signal photons, and preferably over a wavelength range in which the linear refractive index of the waveguide is at least about 1.8

Moreover, the material forming the waveguide 102 exhibits a high third-order optical nonlinearity. For example, the material forming the waveguide can exhibit a high $\chi^{(3)}$-optical nonlinearity corresponding to a nonlinear refractive index ($n_2$) that is equal to or greater than about $1 \times 10^{-19}$ m$^2$/W, e.g., in a range of about $1 \times 10^{-19}$ m$^2$/W to about $3 \times 10^{-17}$ m$^2$/W.

Further, in this embodiment, the material forming the waveguide 102 is substantially transparent at both the pump and the signal radiation wavelengths. For example, the material can exhibit a coefficient of absorption of less than about 50 m$^{-1}$ at the pump and the signal wavelengths. By way of example, in some implementations, the waveguide 102 is preferably substantially transparent to radiation wavelengths from ultraviolet ($\lambda \geq 400$ nm) to telecommunications wavelengths (800-1600 nm) or longer. For example, the waveguide 102 can be substantially transparent to radiation wavelengths in a range of about 400 nm to about 2500 nm, e.g., in a range of about 500 nm to about 1600 nm.

The total loss (absorption plus scattering) of the waveguide 102 at the pump and signal wavelengths can determine the optimal device length for achieving maximum rate of triplet photons generation. In some implementations, such a device length ($L_{max}$) is given by:

$$L_{max} = \frac{\ln\left(\frac{\alpha_p}{3\alpha_s}\right)}{\alpha_p - 3\alpha_s}, \quad \text{Equation (10)}$$

where, $\alpha_p$ is the coefficient of absorption plus scattering losses at the pump wavelength in the mode phase matched with one or more signal modes (e.g., in a higher-order propagating mode), and $\alpha_s$ is the absorptive plus scattering losses at the signal wavelength.

In various embodiments, materials may be optimized to reduce background noise. For example, it has been discovered based on photoluminescence tests that various materials used in devices disclosed herein revealed no sign of fluorescence signal above detector noise. This ensures that the photon triplet sources produce very low background IR noise. Thus, losses may be minimized so as to provide efficient devices. Further, nonlinearities may also be measured over a broad range of wavelengths and may be used to predict and understand device performance.

As noted above, in this embodiment, the waveguide 102 has a substantially rectangular cross-sectional profile with a maximum linear cross-sectional dimension (e.g., a diagonal dimension) in a range of about 100 nm to about 2000 nm. Further, the waveguide 102 can have a length (l) in a range of about 10 micrometers (μm) to about 10 centimeters (cm). Further, the waveguide 102 can have a thickness (t) in a range of about 100 nm to about 2000 nm, and a width (w) in a range of about 100 nm to about 2000 nm. As discussed in more detail below, the cross-sectional profile of the waveguide 102 and its dimensions can be selected so as to optimize the production of direct entangled triplet photons, e.g., by ensuring that the requisite phase matching criteria are met.

While in this embodiment, the waveguide 102 has a substantially rectangular cross-sectional profile, in other embodiments, other cross-sectional profiles, e.g., square, can be utilized.

In this embodiment, the waveguide 102 is formed of titania (TiO$_2$) and the substrate 104 and the top cladding 106 are both formed of silica (SiO$_2$). For example, the waveguide 102 can be formed from a polycrystalline anatase TiO$_2$ thin film deposited on the substrate 104, e.g., in a manner discussed below. In other embodiments, the materials forming the waveguide can include, without limitation, silicon nitride, diamond, Chalcogenide glasses, sapphire, TeO$_2$, and ZnO. Further, in other embodiments, the materials forming the substrate and/or the top cladding can include, without limitation, magnesium fluoride (MgF$_2$), quartz, sapphire, SU-8, a fluoropolymer known as cytop, aluminum oxide (Al$_2$O$_3$), and zinc oxide (ZnO). Further, in some embodiments, the top cladding can be air or vacuum. Applicants have discovered unexpectedly that TiO$_2$ can be a particularly suitable material for forming the waveguide.

In use, pump photons generated by the laser source 110, e.g., a source generating lasing radiation at a wavelength of 500 nm, is coupled into the waveguide 102. In some embodiments, the waveguide 102 is designed so as to provide a phase matching condition between one or more high order modes of the pump laser radiation introduced into the waveguide and one or more modes suitable for the propagation of triplet photons generated via nonlinear interaction of the pump radiation with the waveguide material. In particular, as discussed in more detail below, the dimensions of the waveguide can be selected such that the effective refractive indices of the waveguide at the pump wavelength and at the signal wavelength(s) (i.e., the wavelength of the triplet photons) would lead to the phase matching condition required for efficient generation of the triplet photons.

As noted above, the signal-frequency spread can be highly sensitive to fluctuations in the pump wavelength. An expansion parameter of the signal can be defined as the spread in signal wavelengths over the shift in pump wavelength from the perfectly phase-matched point. The expansion parameter can be highly dependent on the dispersion of the waveguide. For the simplest case of a pump photon splitting into three signal photons in the same mode, the full-width half-maximum of the signal wavelength is given by:

$$\Delta\omega_s = \frac{4\sqrt{(\Delta k'_{ps})(\Delta \omega_p)}}{\sqrt{3k''_s}} \quad \text{Equation (11)}$$

where, $\Delta\omega_s$ is the theoretical full width at half maximum (FWHM) of the signal wavelength, $\Delta k_{ps}'$ is the group velocity mismatch between the pump and the signal, $\Delta\omega_p$ is the pump mismatch from the point of perfect phase matching, and $k_s''$ is the signal group velocity dispersion.

The above Equation (11) shows that for a finite offset in the pump wavelength, minimizing the group velocity mismatch and maximizing the group velocity dispersion can limit the expansion of the signal spectrum. As discussed in more detail below, this can be accomplished by manipulating the size, shape, and relative dimensions of the waveguide in which triplet photons are generated. In particular, fabricating waveguides on-chip in accordance with the present teachings provides access to additional degrees of freedom in waveguide dimensions and shape critical to dispersion engineering.

Figure 4A:
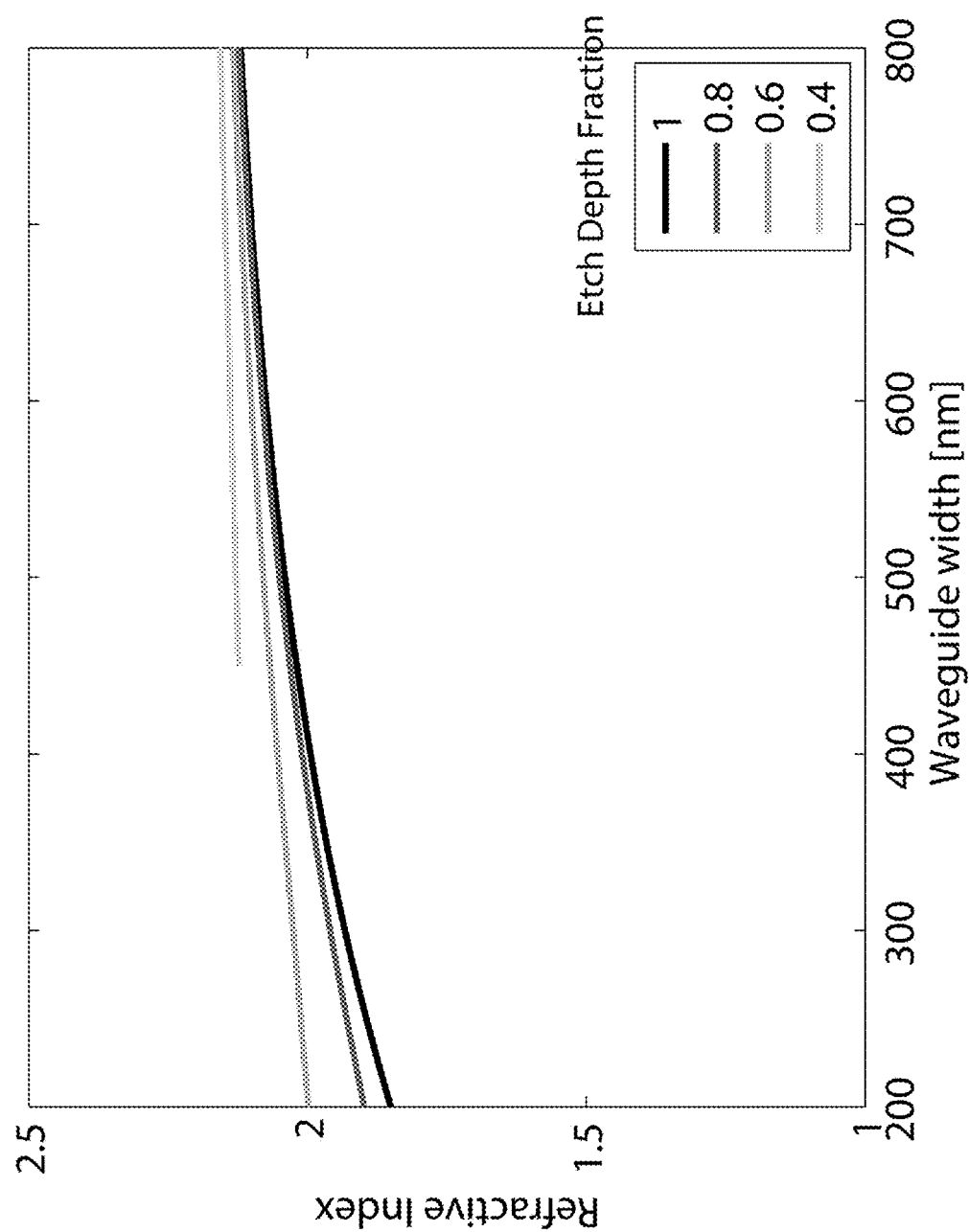
FIG. 4A shows theoretically calculated wavelength dispersion of the refractive index of a TiO$_2$ waveguide (a single film having a thickness of 750 nm) as a function of the waveguide width for a number of different etch depth fractions.
Figure 4B:
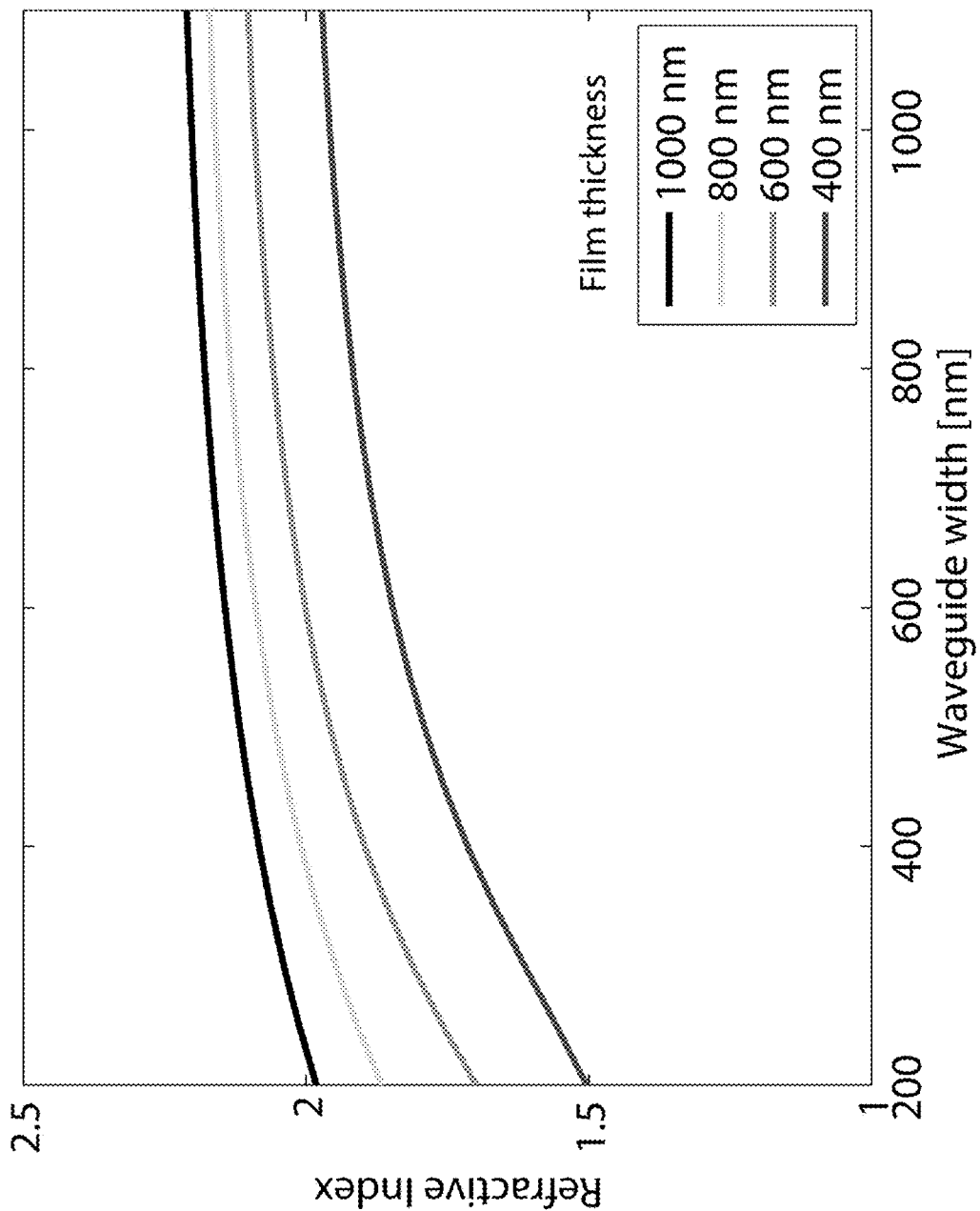
FIG. 4B shows theoretically calculated wavelength dispersion of the refractive index of a TiO$_2$ waveguide as a function of the waveguide width for a number of different waveguide thicknesses.

More specifically, the wavelength dispersion of the refractive index of the waveguide 10 can depend on a number of parameters, such as the thickness, the width, and the etch depth fraction of the waveguide. As shown in FIG. 3C, the etch depth fraction of the waveguide refers to the ratio of etch to thickness of the waveguide. By way of example, FIG. 4A shows theoretically calculated wavelength dispersion of the refractive index of a $TiO_2$ waveguide as a function of the waveguide width for a number of different etch depth fractions. FIG. 4B shows the theoretically calculated wavelength dispersion of the refractive index of a $TiO_2$ waveguide as a function of the waveguide width for a number of different waveguide thicknesses. Such dependencies of the effective refractive index of the waveguide can be employed to ensure that the phase matching condition is achieved for a given pump wavelength and one or more signal wavelengths (i.e., one or more wavelengths associated with the simultaneously generated triplet photons).

For example, one or more of these parameters can be adjusted so as to obtain a match between an effective refractive index of at least one propagating mode of the pump radiation through the waveguide, which can in many cases be a higher propagating mode, and an effective refractive index of at least one waveguide mode in which the signal photons (i.e., the simultaneously generated triplet photons) can propagate. The effective refractive index of a waveguide mode ($n_{eff}$) can be defined as $$\left(\beta = n_{eff}\left(\frac{2\pi}{\lambda}\right)\right),$$

where $\beta$ denotes the phase change per unit length associated with radiation propagating in that mode and $\lambda$ is the radiation wavelength. In general, the effective refractive index is a complex quantity that varies from one mode to another, and can depend on a number of factors, such as the intrinsic refractive indices of the waveguide's core and cladding and the spatial distribution of the fields associated with a mode.

Figure 5A:
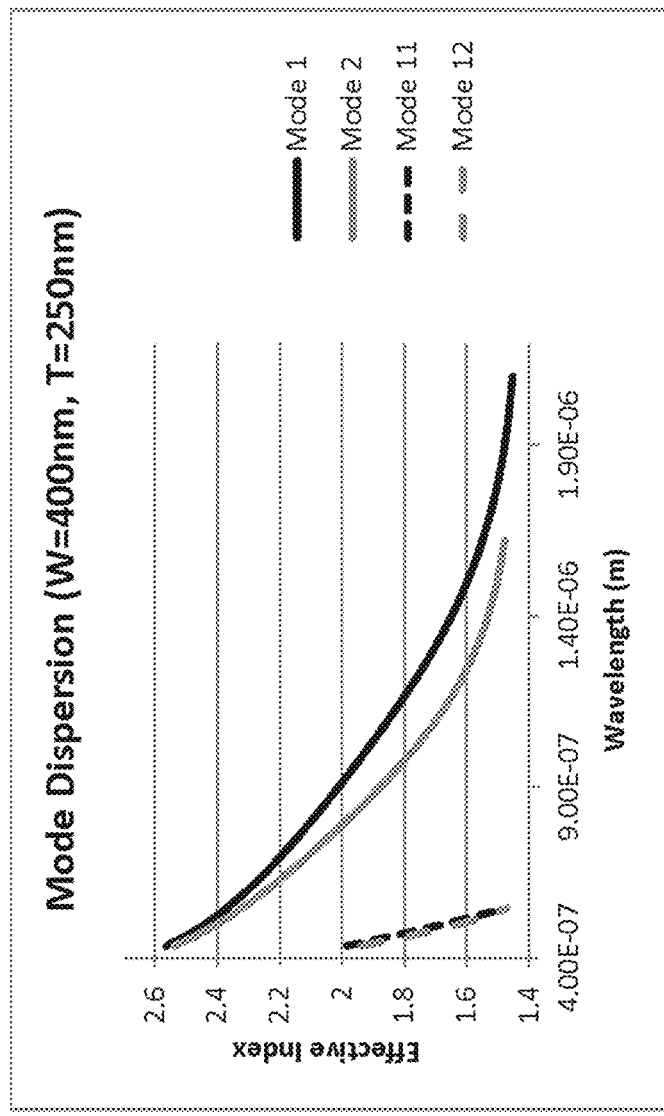
FIG. 5A shows simulated mode dispersion of four modes in an anatase TiO$_2$ waveguide having a width of 400 nm, a thickness of 250 nm, and silica cladding.
Figure 5B:
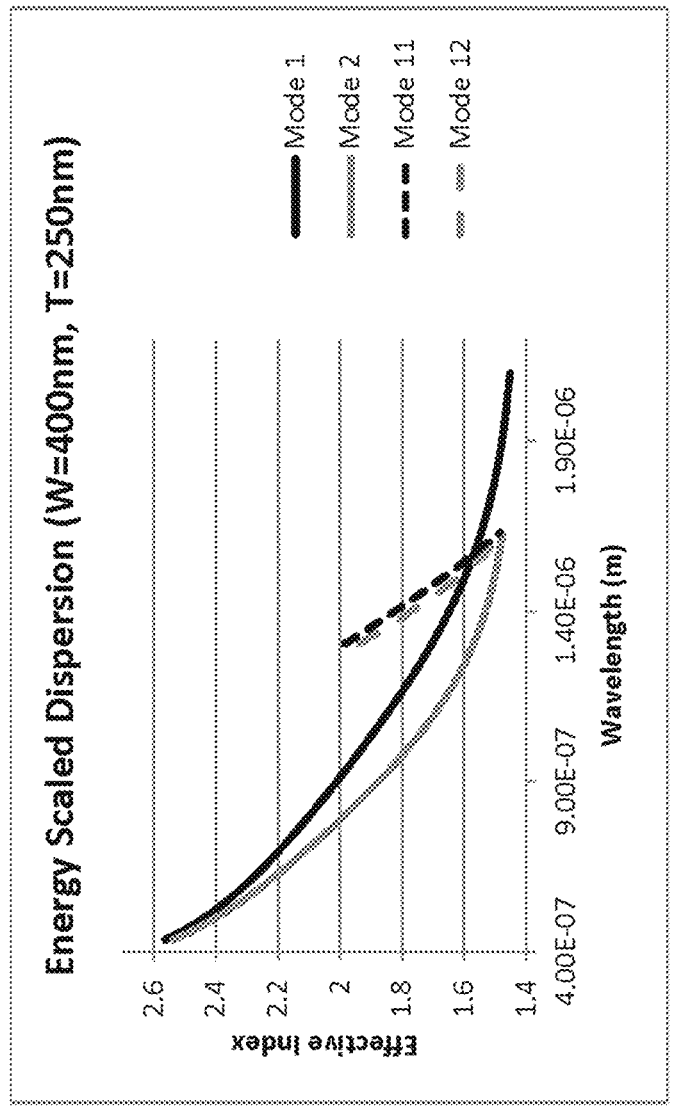
FIG. 5B shows dispersion of modes 11 and 12 of the four modes of FIG. 5A shifted to 3λ to visualize the intercepts between pump and signal modes that provide the perfect phase-matching points.
Figure 6A:
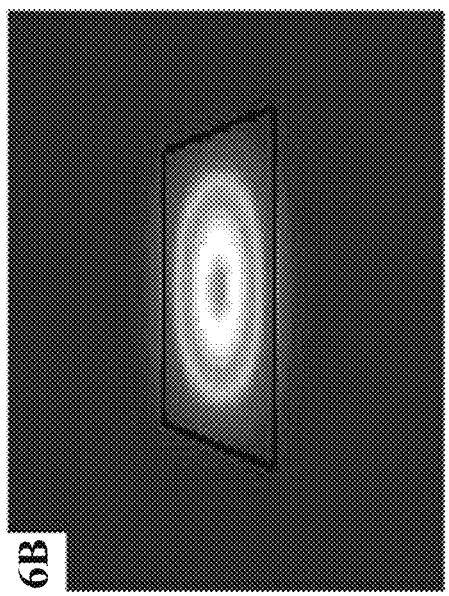
FIG. 6A-6D show theoretically calculated intensity profiles of modes of the four modes of FIG. 5A: Mode 1 (6A); Mode 2 (6B); Mode 11 (6C); and Mode 12 (6D) at 450 nm wavelength.
Figure 6B:
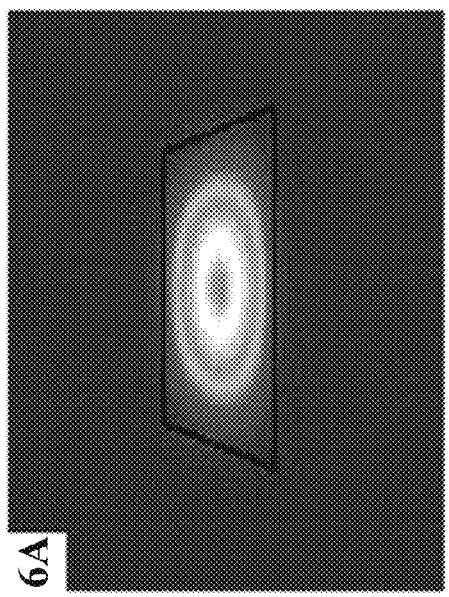
Figure 6C:
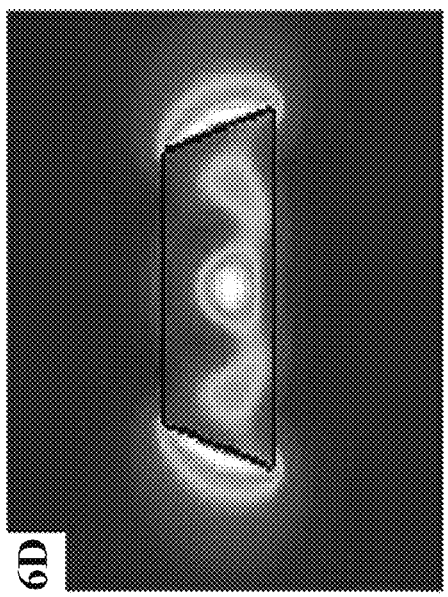
Figure 6D:
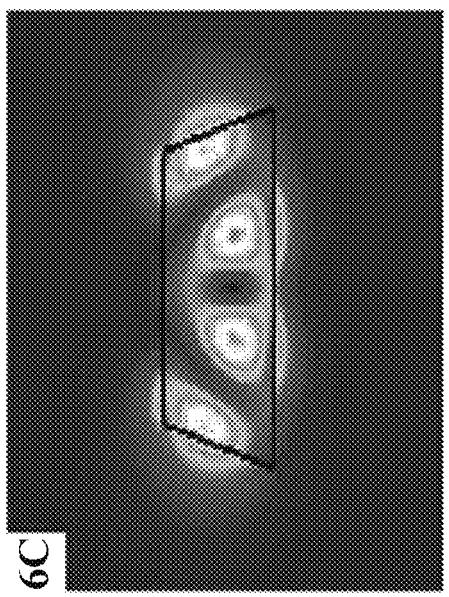

By way of example, FIG. 5A shows simulated mode dispersion of four modes in an anatase $TiO_2$ waveguide having a width of 400 nm, a thickness of 250 nm, and silica cladding. The intensity profiles of these four modes are shown in FIG. 6A-6D. FIG. 5B shows the data in FIG. 5A with dispersion modes 11 and 12 shifted to 3λ to visualize the intercepts between pump and signal modes that provide the perfect phase-matching points (522.4 nm between modes 11 and 1; 507.3 nm between modes 12 and 1; 547 nm between modes 11 and 2; and 544.4 nm between modes 12 and 2). Table 1 below shows phase matched modes and corresponding pump wavelength and TE polarization fraction and effective nonlinearity calculated using the modal fields.

TABLE 1

Phase matched modes and corresponding pump wavelength and TE polarization fraction.

| | Phase Matching Points | | | |
|---|---|---|---|---|
| Pump Mode | 11 | 12 | 11 | 12 |
| Pump TE fraction | 17% | 89% | 17% | 89% |
| Signal Mode | 1 | 1 | 2 | 2 |
| Signal TE fraction | 99% | 99% | 0.30% | 0.30% |
| Phase matched pump wavelength (nm) | 522 | 507 | 547 | 544 |
| Nonlinear Coefficient ($W^{-1}$ $km^{-1}$) | 7 | 38 | 2 | 6 |

Figure 7:
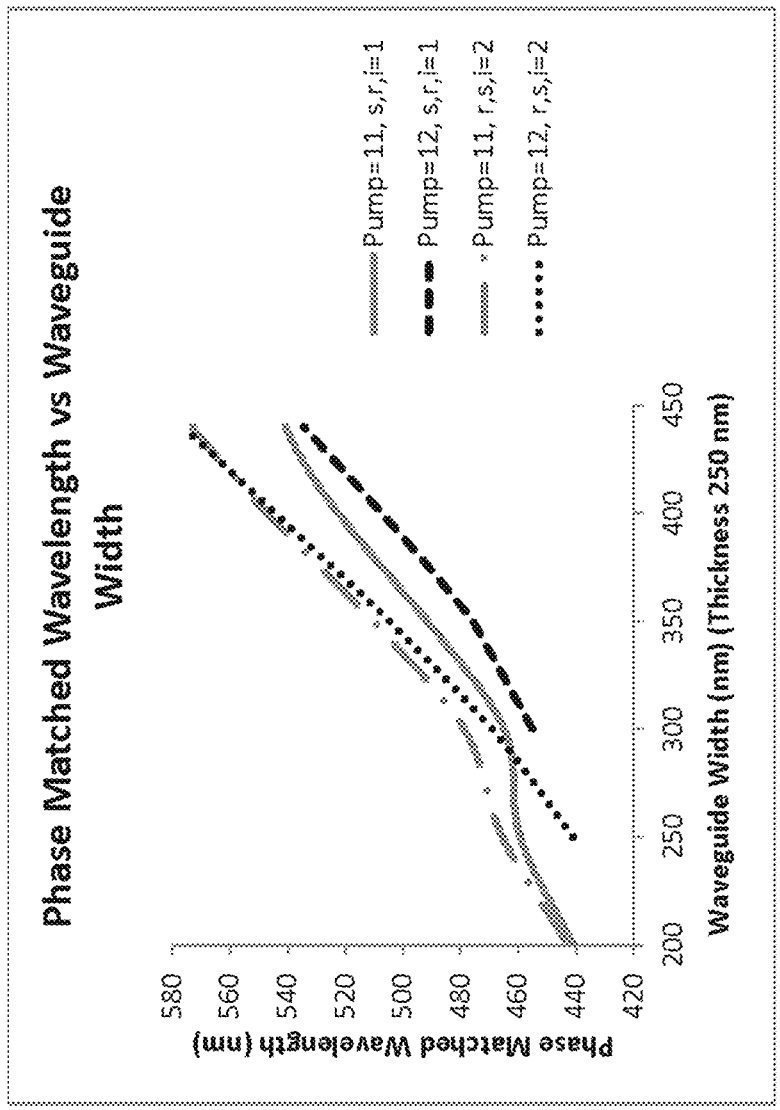
FIG. 7 shows simulated phase matching wavelengths between pump modes 11 and 12 and signal modes 1 and 2 as a function of waveguide width. These simulations are of anatase TiO$_2$ waveguides with a thickness of 250 nm surrounded by silica cladding.

By way of further illustration, FIG. 7 shows simulated phase matching wavelengths between pump modes 11 and 12 and signal modes 1 and 2 as a function of the waveguide width.

In many embodiments, a high conversion efficiency of pump photons into triplet photons requires both phase matching and good modal overlap. In the above example, the phase matching between modes 1 and 12, and between modes 2 and 11 and their respective effective nonlinearities (modal overlap) can ensure that a good conversion efficiency can be achieved by, e.g., introducing the pump photons via mode 12 and generating signal photons in mode 1 and/or introducing the pump photons via mode 11 and generating signal photons in mode 2. Improving the nonlinear coefficient value for the interaction can further enhance the efficiency of the TOSPDC process.

The degree of modal overlap can be estimated, for example, by using the overlap function described in Equation (12) below and can be used to calculate the effective nonlinearity of the TOSPDC interaction for each combination of modes.

The four-field overlap $n_{ijkl}$ can be expressed as:

Equation (12)
$$\eta_{ijkl} \equiv \frac{1}{A_{eff(ijkl)}} = \frac{\int\int E_i^{(s)} E_j^{(p)*} E_k^{(p)*} E_l^{(p)*}\, dx\, dy}{\sqrt{\int\int |E^{(s)}|^2 dx\, dy \int\int |E^{(p)}|^2 dx\, dy \int\int |E^{(p)}|^2 dx\, dy \int\int |E^{(p)}| dx\, dy}}$$

where i, j, k, l={x, y, z} and the superscripts s and p refer to the pump and signal E-fields, respectively. The effective area corresponds to the inverse of the overlap, and can be used in the definition of the nonlinear coefficient γ, given in Equation (4).

In various embodiments, waveguides may be designed to achieve the highest possible conversion efficiency from visible pump photons to infrared photon triplets. The design can depend on the choice of materials in the device, including for example the bottom cladding, top cladding, and core material of the waveguide. Dimensions and geometry of the device are parameters that can be changed to optimize the device, including for example the waveguide top width, thickness, etch fraction, and sidewall angle, as seen for example in FIG. 3C. The sidewall angle may be defined as the angle between the substrate surface and the side wall of the waveguide.

As noted above, due to the sensitivity of the output triplet-photon spectrum to changes in pump wavelength relative to the phase-matching points, devices according to the present teachings are designed and "matched" to a pump laser source. For example, mode-solving simulation software can be employed to implement the present teachings for designing the geometry and dimensions of a nonlinear waveguide in which the triplet-photons are produced. By way of example, a simulation software marketed by the tradename MODE Solutions by Lumerical Solutions, Inc. of Vancouver, Canada can be utilized to design, analyze and optimize waveguide structures according to the present teachings. One feature of this software is an Eigenmode Solver, which calculates the physical properties of guided modes in arbitrary waveguides using Maxwell's equations on a cross-sectional mesh of the waveguides. Meshing the waveguide geometry is accomplished using a finite difference algorithm. Maxwell's equations then become a matrix eigenvalue problem, which can be solved using sparse matrix techniques to obtain the effective index and mode profiles of the waveguide modes.

In some embodiments, for additional accuracy, the optical properties of a film of non-linear material that will be used for waveguide fabrication can be measured and this data can be used in the simulation. By way of example, such optical properties can be the refractive index of the material forming the waveguide, the dispersion exhibited by the refractive index, etc. This allows fabrication of waveguides with a specific set of dimensions and expected phase-matching point(s).

Accordingly, in some embodiments, simulation software may be used to determine the optimal waveguide dimensions for a given choice of device materials. For example, the Eigenmode Solver described above may be used to calculate the properties of guided modes (for example, effective index, group velocity, dispersion, and mode profile) at visible, $\lambda_p$, and infrared, $3\lambda_p$, wavelengths. Mathematical software, such as MATLAB by The Mathworks, Inc., may be used to calculate the modal overlap using the visible and infrared mode profiles of each possible pair of modes at their phase matching point, e.g. using Equation (12) above. Utilizing information about the material's nonlinear index, $n_2$, the effective nonlinearity, $\gamma$, may be calculated. In some embodiments, waveguide dimensions are chosen such that at least one visible mode (at $\lambda_p$) is phase matched with an infrared mode (at $3\lambda_p$) with high effective nonlinearity (e.g. greater than 50/W/km in $TiO_2$ waveguides).

In some embodiments, a method for designing a waveguide for generating direct triplet entangled photons includes modeling a waveguide dimensioned to support one or more propagating modes in the visible portion of the electromagnetic spectrum, e.g. in a wavelength range from about 400 nm to about 700 nm, and one or more propagating modes in the infrared portion of the electromagnetic spectrum. e.g. in a range from about 800 nm to about 1500 nm. The method further includes calculating wavelength dispersion curves of the visible and the infrared modes for a plurality of values of one or more geometric dimensions or parameters of the waveguide. Mathematical software, such as eigenmode solver by Lumerical MODE Solutions and MATLAB, may be used for such calculations. The method may further include identifying, based on the calculated dispersion, one or more geometric dimensions or parameters of the waveguide that result in phase matching between the visible and infrared modes. In some embodiments, the method may further include calculating modal overlap characteristic, such as a nonlinearity coefficient for the modes, for a plurality of values of one or more geometric dimensions or parameters of the waveguide. The method may include identifying, based on the calculated dispersion characteristic and the modal overlap characteristic, one or more geometric dimensions or parameters of the waveguide that result in both phase matching and high modal overlap between the visible and infrared modes.

Implementation of the design of a triplet photon-generating device may use several techniques. In some embodiments, after fabrication, third harmonic generation (THG) using either a tunable or broadband mid-infrared source can be used to obtain accurate information about the wavelength of the phase matching points. A tunable visible laser or diode laser with wavelength directly on the phase match points can then be used to pump the device and efficiently generate a narrow spectrum of triplet photons. For example, FIGS. 12A-12D, which are described further below, show measured THG spectra from fabricated waveguides. Alternatively, many waveguides can be fabricated on the same chip with slightly different dimensions (for example, top widths). The waveguide with a phase matching point that matches the wavelength of the available visible pump laser may be utilized. This allows use of higher power visible lasers which tend to have a fixed wavelength.

THG is the inverse process of down-conversion and relies on the same nonlinearities and is subject to the same restrictions in order to achieve high conversion efficiency. The impact of modal overlap on third order spontaneous parametric down-conversion (TOSPDC) may be investigated by using data from third harmonic generation (THG), for example, in $TiO_2$ waveguides. THG and TOSPDC rely on the $\chi^{(3)}$ nonlinearity in the medium. Most $\chi^{(3)}$ tensor elements in materials are zero. Applicants have found that the modal overlap needs to be calculated only for the field components which will excite each non-zero $\chi^{(3)}$ tensor element, rather than the total modal fields.

For example, the nonlinear field excited by the $\chi^{(3)}$ nonlinearity is given by $\vec{E}_{NL} = C\chi^{(3)} \vec{E}_1 \vec{E}_2 \vec{E}_3$, where $E_1$, $E_2$, and $E_3$ are the incident fields and $E_{NL}$ is the excited field. The conversion efficiency of the nonlinear process is determined largely by the overlap between the incident and excited fields. For anatase $TiO_2$, the only nonzero tensor elements are $\chi^{(3)}_{xxxx}$, $\chi^{(3)}_{yyyy}$, $\chi^{(3)}_{zzzz}$, $\chi^{(3)}_{yyzz}$, $\chi^{(3)}_{zzyy}$, $\chi^{(3)}_{zzxx}$, $\chi^{(3)}_{xxzz}$, $\chi^{(3)}_{yyxx}$, $\chi^{(3)}_{xxyy}$, and all permutations of these indices. The only overlap calculations that need to be completed correspond to these indices, i.e. $\iint \vec{E}_{x1} \vec{E}_{x2} \vec{E}_{x3} \vec{E}_{x4} dxdy$ for $\chi^{(3)}_{xxxx}$ and $\iint \vec{E}_{y1} \vec{E}_{y2} \vec{E}_{z3} \vec{E}_{z4} dxdy$ for $\chi^{(3)}_{yyzz}$ and so forth. For a material that is polycrystalline with grains less than about $\frac{1}{10}$ of the incident wavelength in size and oriented randomly, the contribution of each nonlinear tensor element will be equivalent due to symmetry conditions. Further, for amorphous and isotropic materials, e.g., ones where the grains are less than about $\frac{1}{10}$ of the wavelength, the tensor can be treated as effectively diagonal, e.g., only xxxx, yyyy, and zzzz terms can be considered. This theory can be applied to other polycrystalline, oriented polycrystalline, single crystal, and amorphous materials. Proper considerations of the symmetry conditions, alignment of the crystal, alignment of the modal fields, and non-zero tensor elements can be made. In some embodiments, this technique may be used to achieve good agreement between predicted phase matching points and THG observed in devices that are fabricated. The same methods will hold true for similar $\chi^{(3)}$ nonlinear process (i.e. THG and TOSPDC).

Unlike third harmonic generation (THG), third-order spontaneous parametric down-conversion (TOSPDC) will occur if the pump wavelength is offset slightly from the phase match point. This results in generation of a broader spectrum of infrared photons. Due to the constraints of energy conservation and phase matching, the phase mismatch ($\Delta n_{eff} = n_{eff,p} - n_{eff,s}$) must be positive if the dispersion of the signal (infrared) mode is normal and negative if the dispersion of the signal (infrared) mode is anomalous.

Accordingly, in various embodiments, a device design method based on the theory of phase matching, energy conservation, and modal overlap may be created to drive the fabrication of triplet photon generating devices. For example, the method may employ mathematical software (e.g. an eigenmode solver by Lumerical MODE Solutions and MATLAB) to determine waveguide dimensions that have phase matching points in the wavelength range of visible pump lasers with high effective nonlinearity. Based on the dispersion of the modes involved in phase matching, the rate at which the signal spectrum broadens if the waveguide dimensions are off from the design due to fabrication variations may be estimated.

In some embodiments, the triplet photons, namely, signal 1(s), signal 2 (r), and idler (i) photons can be generated in one propagating mode, that is, the phase matching condition is degenerate. In other embodiments, these triplet photons can be generated in 2 or 3 modes. By way of example, signal 1(s) and signal 2 (r) photons can be generated in one propagating mode and the idler (i) photon can be generated in a different propagating mode. The generation of the triplet photons in different modes, e.g., characterized by different polarizations, can allow spectrally separating them. By way of example, in some embodiments, the individual triplet photons can be separated after exiting the waveguide by using, e.g., polarization optics, and dichroic mirrors. The spectral separation of the triplet photons can enable the heralding of the photon pairs. In some embodiments, by dispersion engineering sets of 3 or 4 modes (e.g., 1 for pump photons and 2 or 3 for the signal photons) in accordance with the present teachings, spectrally separate output photons can be produced. Different signal photons within the same triplet can then be sent along separate paths, even within the device.

In some embodiments, a triplet photon source according to the present teachings can be configured, e.g., via modal and dispersion engineering of its waveguide, to produce heralded photon pairs. The output signal of such a source can be separated into two or more modes that are spectrally distinct from one another. In some embodiment, this can be achieved by providing phase matching between the pump and the signal in two modes with different dispersion parameters. The larger the difference in dispersion parameters between the signal modes, the greater will be the spectral separation of signal photons propagating in those modes. A wavelength dependent coupler, for example, can be employed in an integrated photonic device to separate these signal modes.

Figure 8:
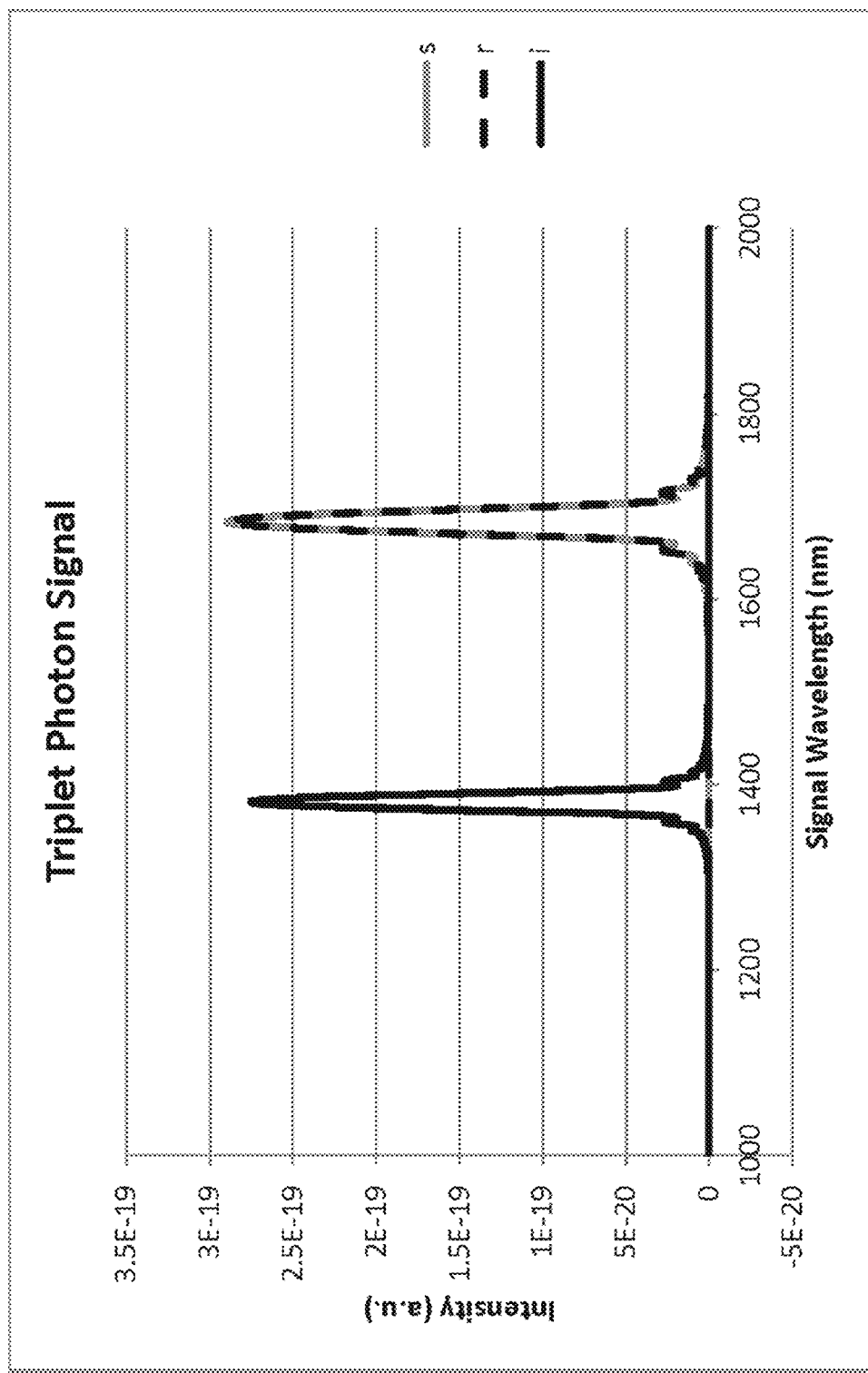
FIG. 8 shows exemplary calculated output signal spectra of triplet photons in which the signal modes s and r are spectrally distinct from signal mode i.

By way of illustration, FIG. 8 shows simulated signal wavelengths in two different signal modes 1 and 2 discussed above in connection with a TiO$_2$ waveguide having a 400-nm width and a 250-nm thickness and a silica cladding. Phase matching is achieved near 520 nm with the pump mode 12 with signal photons generated in modes 1 and 2. The wavelength separation of the signal photons generated in these two modes can be utilized to separate the photons in these two modes after they exit the waveguide.

Figure 9A:
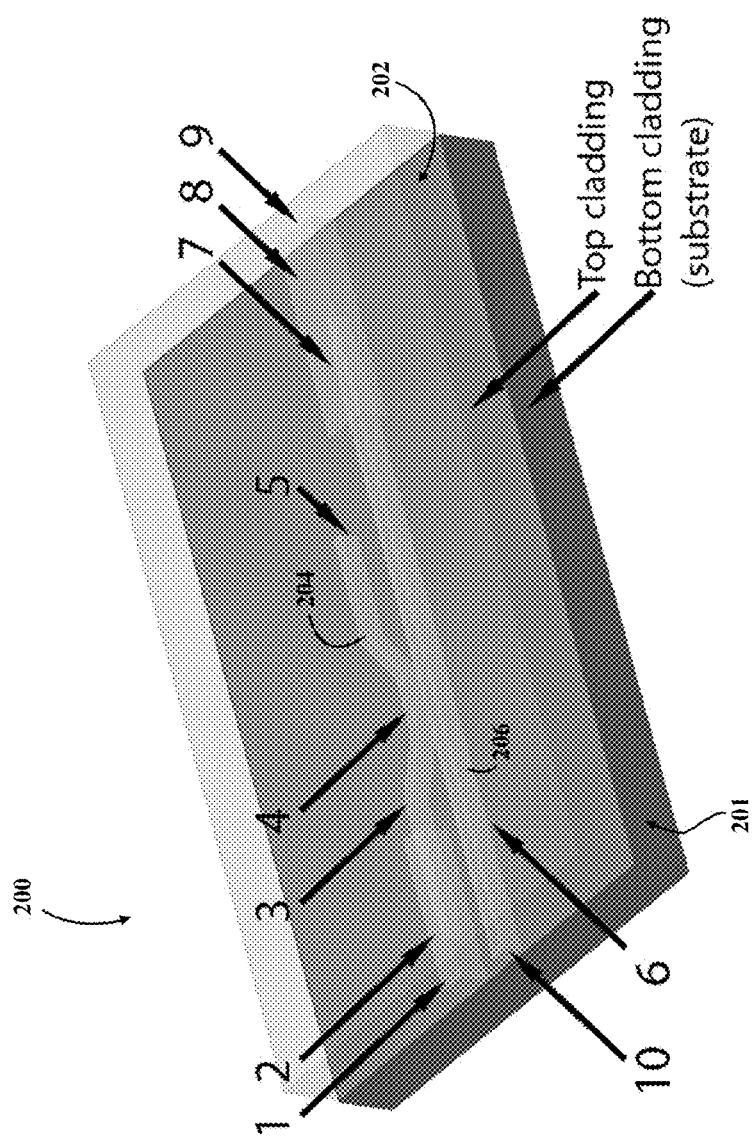
FIGS. 9A & 9B schematically depict a device for generating direct entangled triplet photons in accordance with another embodiment of the present teachings, which is implemented as an integrated TOSPDC source on-chip.
Figure 9B:
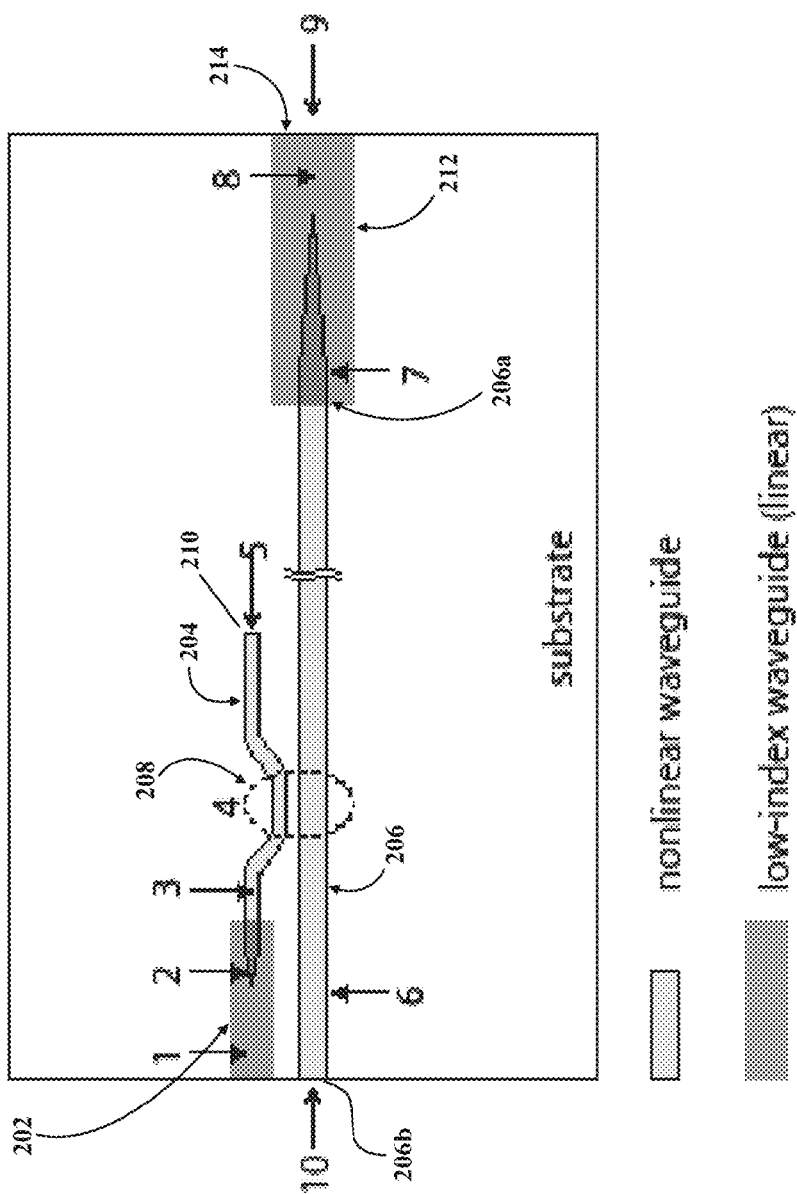

FIGS. 9A and 9B schematically depict a device 200 for generating direct entangled triplet photons in accordance with another embodiment of the present teachings, which is implemented as an integrated TOSPDC source on-chip. The device 200 includes an underlying SiO$_2$ substrate 201 on which various components of the device are disposed and a top cladding 202. An input coupler 203, e.g., an (SU-8) polymer coupling pad, receives laser radiation from a laser pump source (not shown) and couples that laser radiation to a single-mode TiO$_2$ waveguide 204. The device further includes a multi-mode TiO$_2$ waveguide 206 that can support higher order modes of the pump radiation, and is optically coupled to the single mode waveguide 204 via a SM-MM (single-mode/multi-mode) coupler 208. At least a portion of the pump radiation propagating through the single-mode TiO$_2$ waveguide is coupled by the SM-MM coupler 208 (via evanescent optical coupling) to the multi-mode TiO$_2$ waveguide, where some of that radiation excites one or more higher-order propagating modes of the multi-mode waveguide. The remainder of the pump radiation propagating through the single-mode waveguides is captured by the pump-light dump-port 210.

Similar to the previous embodiment, the multi-mode waveguide 206 is configured, e.g., in a manner discussed above, to provide phase matching between one or more HOM pump modes and one or more signal modes that can support direct triplet photons that are generated as a result of third-order non-linear interaction of pump radiation with TiO$_2$ forming the waveguide. The triplet signal photons propagate along the multi-mode waveguide to enter a tapered section 206a of the waveguide, which facilitates the coupling of the signal photons into an output coupler 212, e.g., an SU-8 pad, through which the triplet photons can exit the device via an output facet 214. In some embodiments, the multi-mode waveguide 206 includes an input port 206b that can be employed, e.g., for signal alignment after the chip.

Figure 10:
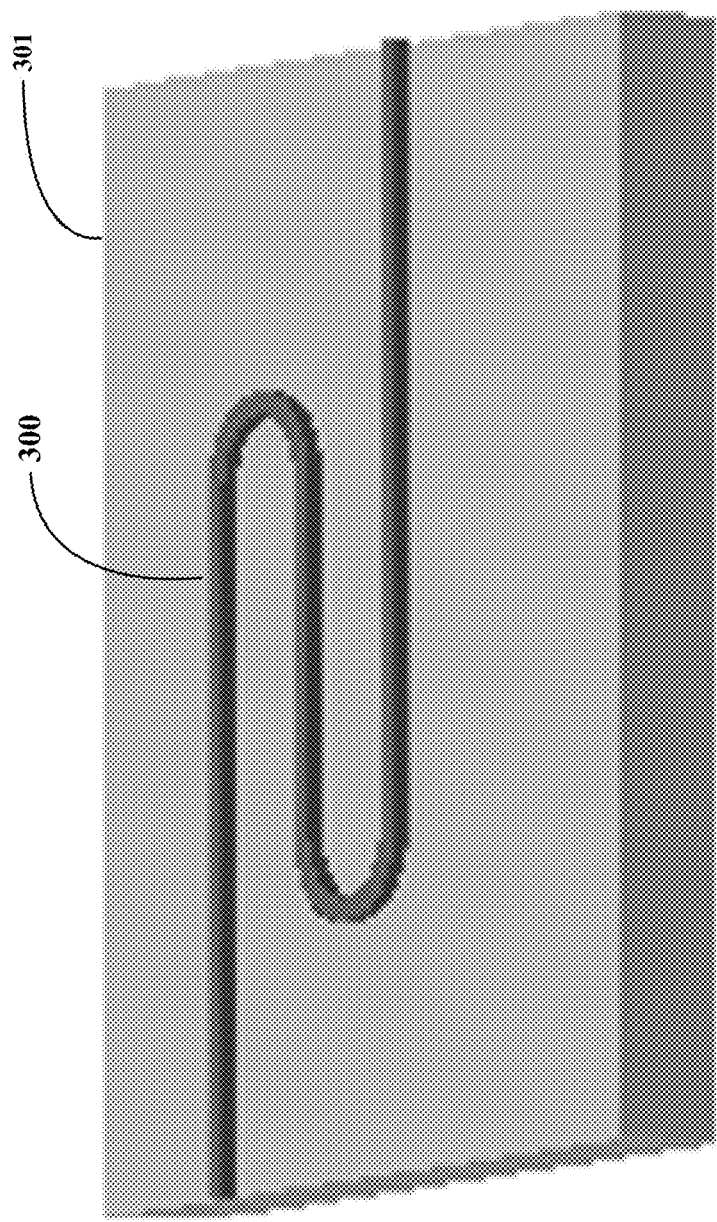
FIG. 10 schematically depicts a portion of an on-chip triplet photon device according to an embodiment of the present teachings that includes a serpentine waveguide disposed on an underlying substrate.

The nonlinear waveguides for generating direct entangled triplet photons according to the present teachings can have a variety of shapes. By way of further illustration, FIG. 10 schematically shows a portion of an on-chip triplet photon device according to an embodiment of the present teachings that includes a serpentine waveguide 300 disposed on an underlying substrate 301. Similar to the previous embodiments, the waveguide 300 and the substrate 301 are configured in a manner discussed above to allow the generation of direct entangled triplet photons in response to the introduction of a pump laser radiation into the waveguide.

In some embodiments, resonant cavities are employed to control and/or enhance the production of direct entangled triplet photons. For example, micro-ring resonators can be employed to control the output spectrum of the triplet photons. For example, micro-ring resonators can be formed of TiO$_2$, e.g., by employing the fabrication methods disclosed in "Integrated TiO$_2$ resonators for visible photonics," published in Opt. Lett. 37, 539-541 (2012).

Ring resonators are a building block for integrated optical devices. Theoretical and experimental results have shown enhancement in second and third-harmonic generation in several photonic material platforms. Enhancement and suppression of spontaneous parametric down-conversion has been studied in free space cavities and integrated photonic crystal cavities. Cavities have also been used to control the output spectrum of nonlinear photonic devices.

In some embodiments, the output spectrum of the device can be "squeezed" into the modes of the resonant cavity without lowering the total conversion efficiency. A microring cavity can be used to improve the conversion efficiency of a TOSPDC photon triplet source by a few additional orders of magnitude while also narrowing and controlling the output spectrum within the confines dictated by phase-matching conditions.

Figure 11:
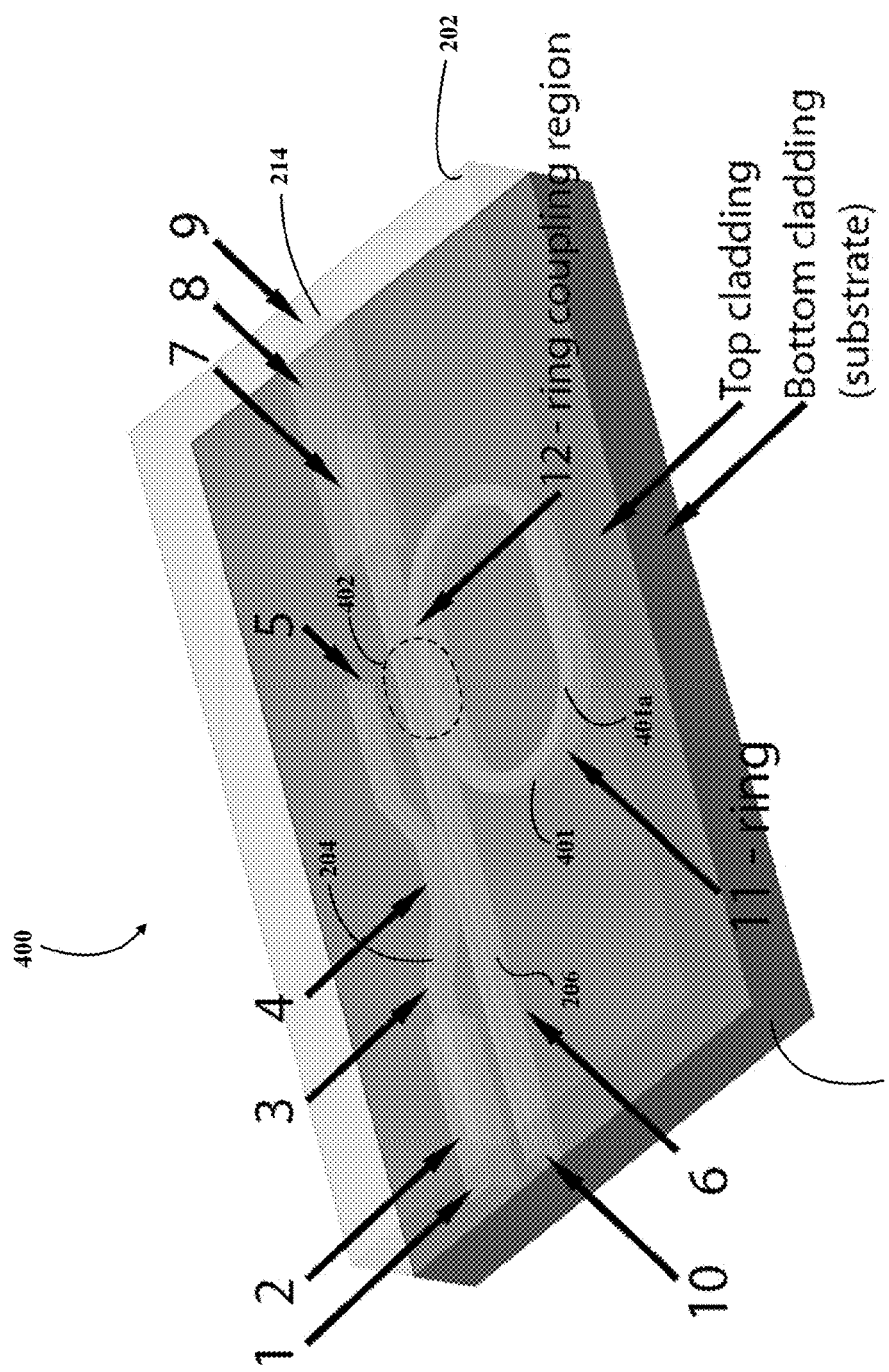
FIG. 11 schematically depicts an embodiment of a device according to the present teachings for generating direct entangled triplet photons.

FIG. 11 schematically depicts an embodiment of a device 400 according to the present teachings for generating direct entangled triplet photons. The device 400 includes the same components as those described above in connection with the above device 200, and in addition, it further includes a ring resonator 401 (herein also referred to as a micro-ring resonator) formed of $TiO_2$ that is disposed on the underlying substrate 201 and underneath the top cladding 201. The ring resonator 401 is formed of a ring waveguide 401a, which can have a cross-sectional area, e.g., width in a range of about 100 nm to about 2000 nm, and a thickness in a range of about 100 nm to about 2000 nm. In some implementations, the circumferential length of the ring resonator can be in a range of about 5 microns to about 20 mm.

The ring resonator 401 is optically coupled to the multi-mode waveguide 206 in a coupling region 402, e.g., via evanescent wave coupling. The optical coupling between the waveguide 206 and the ring resonator 401 allows for coupling of at least a portion of the pump photons into the ring resonator. The waveguide 401a of the ring resonator is configured in accordance with the present teachings to provide phase matching between one or more propagating modes of the pump photons and one or more modes in which signal photons can propagate. At least a portion of the entangled triplet photons generated within the ring waveguide 401 can couple to the waveguide 206 to exit that waveguide via the output facet 214.

The ring resonator 401 can enhance and/or shape the spectrum of the generated triplet photons. For example, the multiple passage of the pump photons around the ring waveguide 401a can enhance the production of the triplet photons. Further, in some embodiments, interference permits the propagation of only a finite number of whispering gallery modes in a select set of frequencies in the ring waveguide 401, thus dictating that the photons propagating through the ring be restricted to these available modes. This can, in turn, narrow the output spectrum of triplet photons generated via a TOSPDC process. Hence, a micro-ring waveguide can be an integral component for shaping the output spectrum of an entangled triplet photon source according to the present teachings.

The following Examples are provided only for further illustration of the various aspects of the present teachings and the feasibility of their implementation and are not necessarily intended to indicate optimal ways of practicing the invention and/or optimal results that can be obtained.

EXAMPLE 1

Submicrometer-wide waveguides were fabricated from 250-nm thick amorphous and anatase $TiO_2$ thin films, which were deposited on oxidized silicon substrates (3.2-micron thick $SiO_2$) at a substrate temperature of 290 K for amorphous $TiO_2$ and 625 K for anatase $TiO_2$ using reactive radio frequency (RF) magnetron sputtering. The oxygen flow rates and RF powers were adjusted to obtain stoichiometric, highly transparent $TiO_2$ thin films. The waveguide pattern was exposed into a 300-nm-thick positive electron-beam (e-beam) resist layer (ZEP-520a) on top of the $TiO_2$ film using a 125-keV electron-beam lithography system. The applied e-beam parameters included a 300×300 $\mu m^2$ write window, a beam current of 500 pA, and a dose of 400-600 $\mu C/cm^2$. After developing the exposed resist, a 50-nm-thick chromium film was deposited by e-beam evaporation and metal lift-off was performed to generate a metal etch mask. The metal pattern was transferred into the $TiO_2$ film using electron cyclotron resonance reactive ion etching. The etch parameters included a $CF_4$ and $H_2$ gas mixture in a ratio of 4:1, a microwave power of 235 W, a substrate power of 150 W, and a chamber pressure of 8.5 mTorr. The etch rate of the amorphous and anatase films was approximately 35 nm/min. After etching, the remaining metal mask was removed using Cr-etchant, and 3-4 $\mu m$ of Cytop fluoropolymer was deposited as a top-cladding layer. Finally, the chips were cleaved to prepare waveguide end-facets. In this manner, polycrystalline anatase $TiO_2$ waveguides with widths of 600 nm, 700 nm, 800 nm, and 900 nm were fabricated.

Figures 12A, 12B, 12C, 12D:
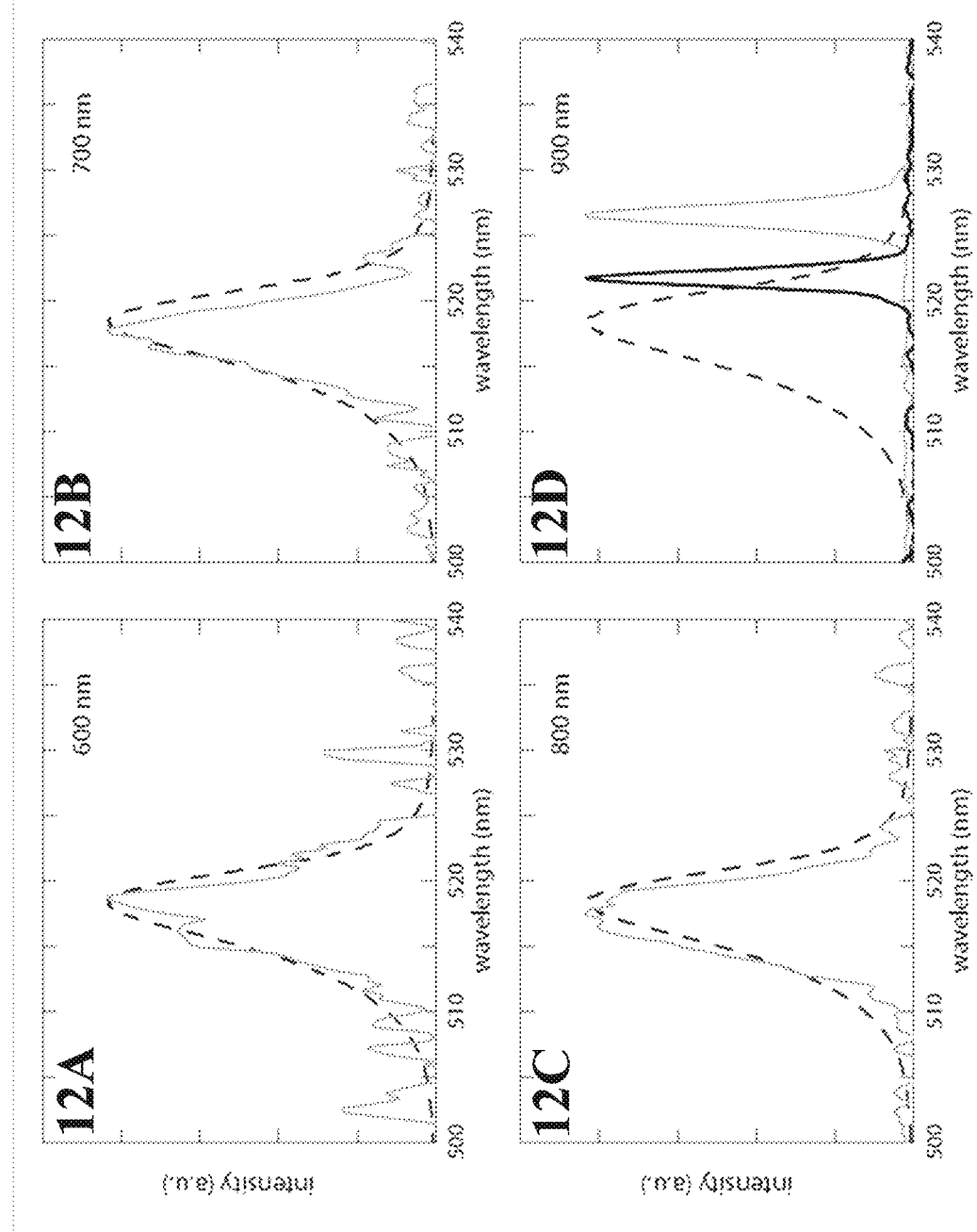
FIG. 12A-12D show measured THG spectra from waveguides fabricated from 250 nm thick polycrystalline anatase TiO$_2$ thin film with widths of 600, 700, 800, and 900 nm.

Using a pulsed pump laser centered at 1550-nm with 17-nm FWHM, $3^{rd}$ harmonic generation of light at 522-nm and 526-nm was observed in two different 900-nm waveguides as evidenced by a streak of green light. As shown in FIG. 12D, the corresponding spectrum of the emitted green light was narrow, which is consistent with phase matching between the fundamental pump mode around 1550 nm and a higher order signal mode in the visible. As shown in FIGS. 12A, 12B, and 12C, the remaining waveguides exhibited a broad, weak emission spectrum in the visible that closely followed the pump spectrum—a result consistent with non-phase-matched third harmonic generation (THG).

The dispersion of all modes in these waveguides was calculated using a finite-difference eigenmode solver. Given a TE-polarized pump beam, all possible phase matching points between the fundamental mode pump in the infrared and higher-order mode signal in the visible were considered. Candidate points near the bandwidth of the pump are shown in Table 2 below:

TABLE 2

| | 600 nm | | | 700 nm | |
|---|---|---|---|---|---|
| pump (nm) | 1519 | 1595 | 1633 | 1508 | 1621 |
| signal (nm) | 506.3 | 531.7 | 544 | 502.7 | 540.4 |
| $\gamma$ ($W^{-1}km^{-1}$) | 42 | $<10^{-3}$ | 26.2 | $<10^{-12}$ | 31.1 |
| signal TE (%) | 89.6 | 12.8 | 37.5 | 65 | 11.4 |

| | 800 nm | | | 900 nm | |
|---|---|---|---|---|---|
| pump (nm) | 1501 | 1572 | 1594 | 1496 | 1565 | 1586 |
| signal (nm) | 500.2 | 523.9 | 531.4 | 498.5 | 521.7 | 528.8 |
| $\gamma$ ($W^{-1}km^{-1}$) | $<10^{-12}$ | 13.4 | $<10^{-12}$ | $<10^{-8}$ | $<10^{-8}$ | 23.7 |
| signal TE (%) | 92.4 | 10 | 89 | 7.4 | 93.4 | 4.7 |

The only calculated phase matching points that fall within the pump bandwidth and has high modal overlap between pump and signal modes are in the 800-nm and 900-nm waveguides at 523.9 nm and 528.8 nm, respectively. Based on scanning electron microscope images of the waveguides, the actual dimensions are slightly different from the design dimensions. Taking these measured dimensions into account shifts the calculated phase matching point in the 800-nm waveguide out of the pump bandwidth and shifts the phase match point in the two 900-nm waveguides close to the observed third harmonic wavelengths at 522 and 526 nm. As seen in FIG. 7, slight fabrication differences can account for a shift of several nanometers in the phase matching point. In many embodiments, modal overlap of the pump and signal can be important for high conversion efficiency. This demonstrates a strong match between simulations and theory with experimental results of THG.

As the 3$^{rd}$ harmonic generation (THG) of the 522-nm signal from a 1550-nm pump is the inverse of third order spontaneous parametric down-conversion, the above generation of THG shows the feasibility of a third-order down-conversion process in the TiO$_2$ waveguides since both processes rely on the same $\chi^{(3)}$ nonlinearity. Further, a signal near 1600 nm was observed when pumping the 900-nm waveguide with 532-nm light, and a signal near 1335 nm was observed when pumping the 900-nm waveguide with 445-nm light. Further, evidence of stimulated down-conversion was observed (a new spectral line appeared when pumping with both 1310-nm and 532-nm light). These observations are consistent with TOSPDC.

EXAMPLE 2

In another example, the dispersion of a number of visible and infrared electromagnetic modes that can be sustained by a waveguide that was assumed to be formed of polycrystalline anatase TiO$_2$ thin film were theoretically modeled as a function of certain geometric parameters of the waveguide. The waveguide was assumed to have a cross-sectional shape characterized by a thickness (t), a width (w), and sidewall angle. The sidewalls of the waveguide were slightly sloped with a sidewall angle fixed at 75 degrees. The dispersion curves associated with the modes were calculated as a function of different values of the waveguide's width and thickness. For example, the top width of the waveguide was varied from 600 nm to 700 nm in 10 nm increments.

Figure 13:
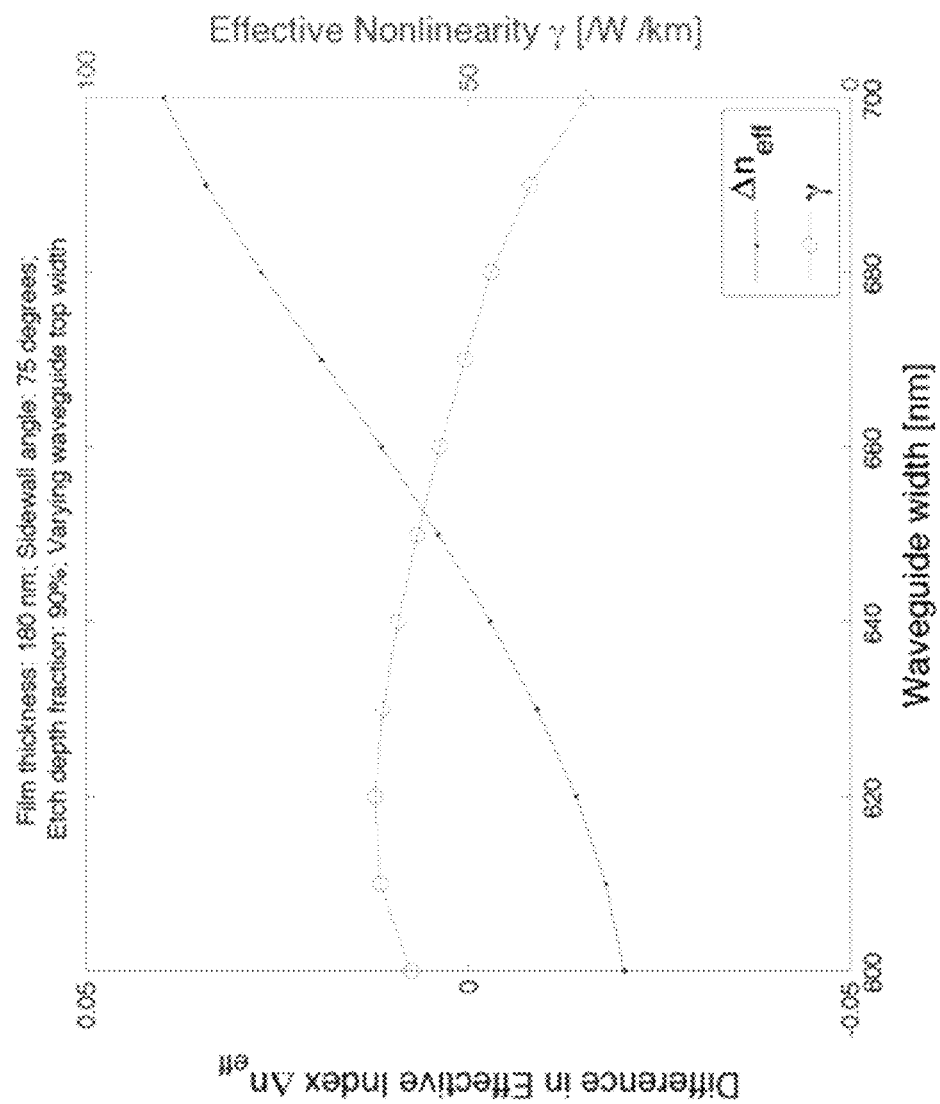
FIG. 13 shows one example of tuning the waveguide width to optimize phase matching and modal overlap between the pump and signal modes.

By way of example, FIG. 13 shows how changing a dimension of the waveguide, the waveguide width, can tune the properties of the device. Specifically, the simulation in FIG. 13 shows both the difference in effective index between the higher order pump mode in the visible and the fundamental signal mode in the infrared, and the effective nonlinearity of the TOSPDC process due to the overlap between these two modes, as a function of varying waveguide width and for a thickness of the waveguide (i.e., thickness of 180 nm). The sidewall angles were fixed at 75 degrees, and it was assumed that 90% of the slab surrounding the waveguide was etched (i.e., etch depth fraction of 90%).

FIG. 13 shows that there exists a "phase match" at a waveguide width of about 650 nm. By sweeping through different waveguide widths, it was observed that for smaller widths (starting at 600 nm), the difference in effective index is negative and there is no phase matching yet. As the waveguide width is increased, perfect phase matching is achieved at a width of 648 nm, and then the difference in effective index slowly increases again. Throughout this whole region, there is a relatively large effective nonlinearity γ (i.e. modal overlap), peaking at about 60/W /km. This shows that a waveguide with a width of about 650 nm would be phase matching with a large effective nonlinearity, making for an excellent triplet source.

A device having a polycrystalline anatase TiO$_2$ thin film with 180 nm thickness was fabricated. The film was deposited on a silicon wafer, with thermal oxide (the undercladding of the device) having a thickness of 3 micrometers. CVD oxide (SiO$_2$) was utilized as the top cladding. For a waveguide width of about 650 nm, etch fraction of 0.9, and sidewall angle of 75 degrees, phase matching between visible mode 10 and infrared mode 1 at 532 nm was achieved with an effective nonlinearity of about 58/W/km, as shown in FIG. 13.

Figure 14:
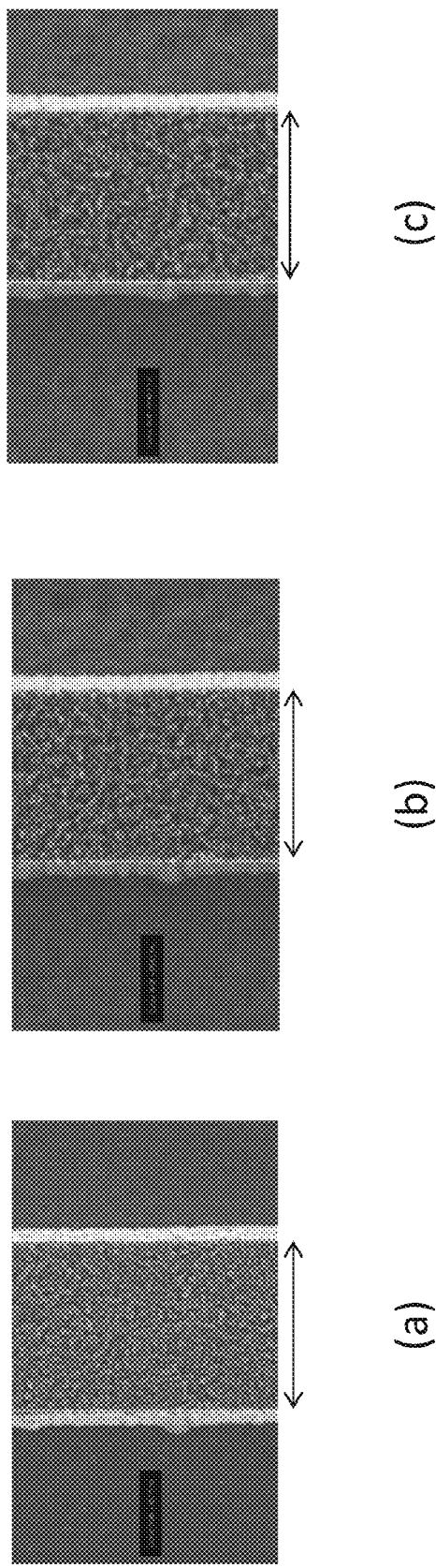
FIG. 14 shows multiple scanning electron microscope images of fabricated TiO$_2$ waveguides.
Figure 15:
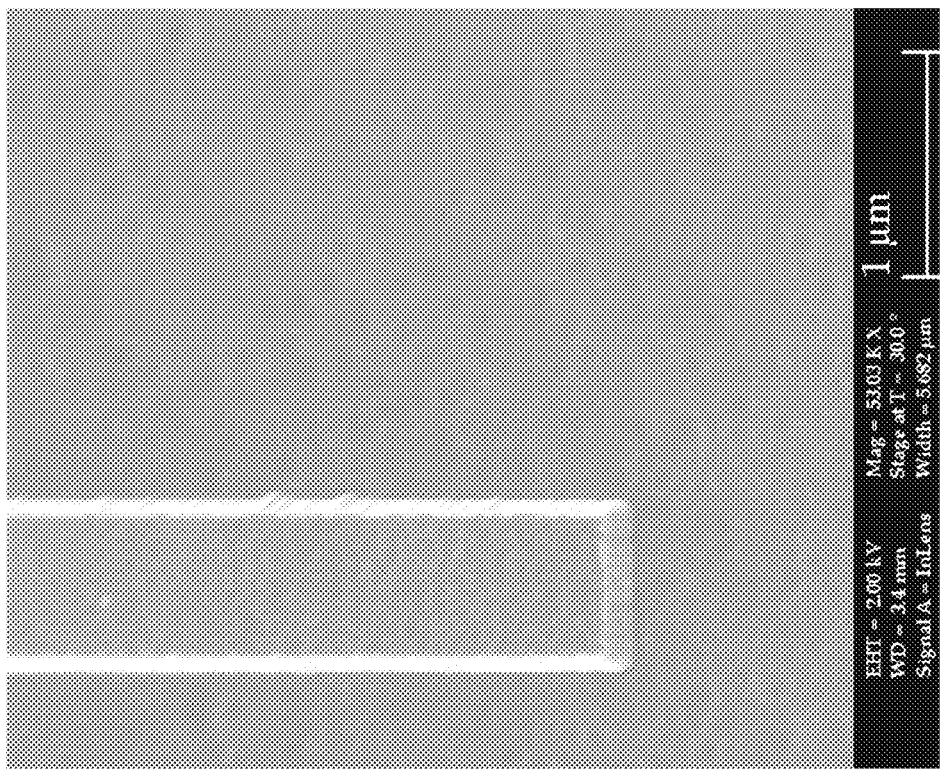
FIG. 15 is an image of a fabricated waveguide taken at 45 degrees to show the aspect ratio.

FIG. 14 shows various waveguides fabricated with dimensions dictated by these design sweeps. Specifically, multiple scanning electron microscope images show TiO$_2$ waveguides fabricated with the 'optimal' dimensions as described above in relation with the sweeps in FIG. 13. FIG. 14(a) shows an image of a waveguide having a thickness of 180 nm, sidewall angle of 75 degrees and a width of 657.5 nm as indicated by the vertical cursor width and arrow. FIG. 14(b) shows an image of a waveguide having a thickness of 180 nm, sidewall angle of 75 degrees and a width of 654.2 nm as indicated by the vertical cursor width and arrow. FIG. 14(c) shows an image of a waveguide having a thickness of 180 nm, sidewall angle of 75 degrees and a width of 649.1 nm as indicated by the vertical cursor width and arrow. FIG. 15 shows an image one of the waveguides in FIG. 14, where the image is taken at 45 degrees to show the aspect ratio.

EXAMPLE 3

Figure 16:
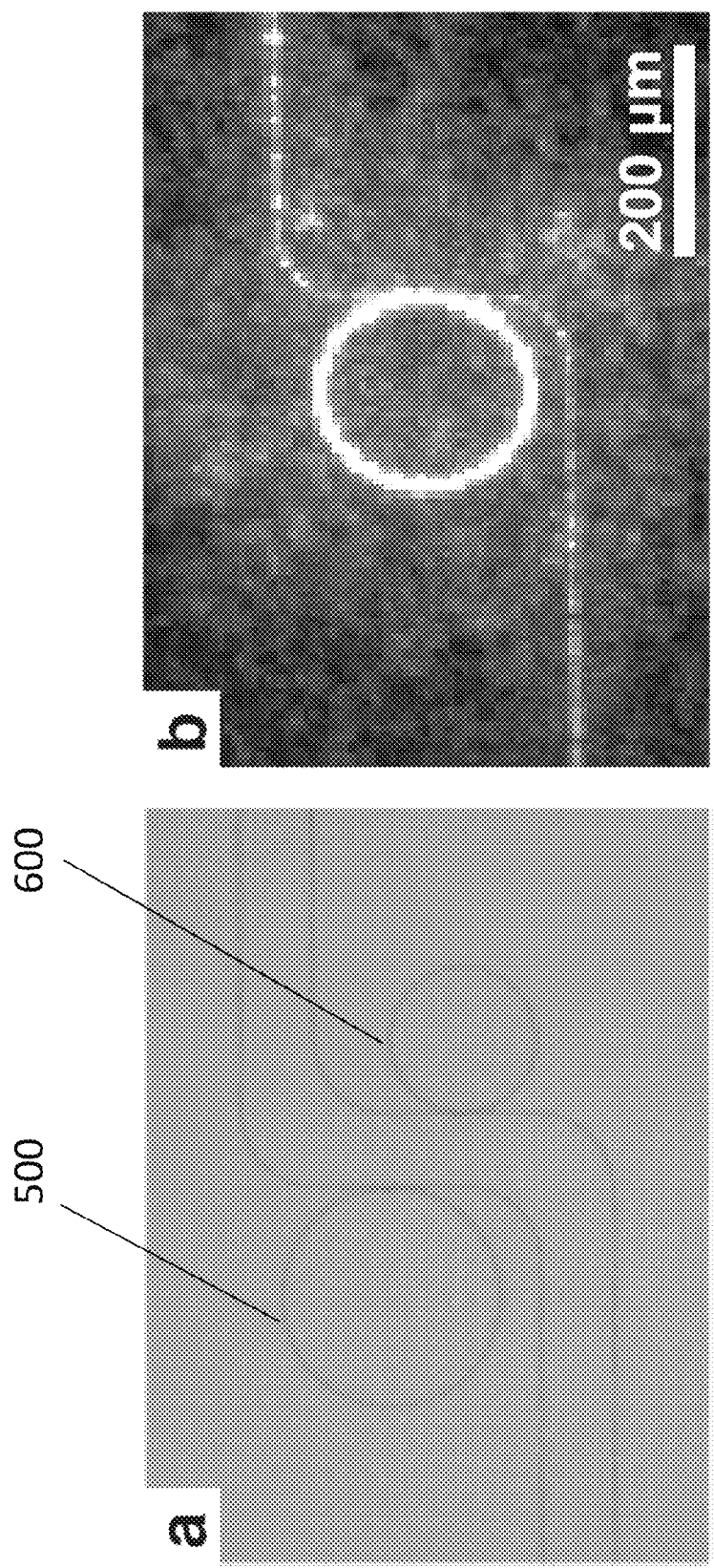
FIG. 16 shows micro-ring resonators fabricated of polycrystalline anatase TiO$_2$.

Micro-ring resonators with diameters down to 200 µm and demonstrated Q-factors of up to 20,000 were fabricated in integrated polycrystalline anatase TiO$_2$ waveguides and propagation losses of 4-6 dB/cm in the telecommunication band were measured. FIG. 16(a) shows a pair of micro-ring resonators 500 and 600 fabricated of polycrystalline anatase TiO$_2$. The micro-resonator 500 has a diameter of 300 µm, and the micro-resonator 600 has a diameter of 200 µm. FIG. 16(b) shows the micro-resonator 500 of FIG. 16(a), having a resonance around 1550 nm.

Figure 17:
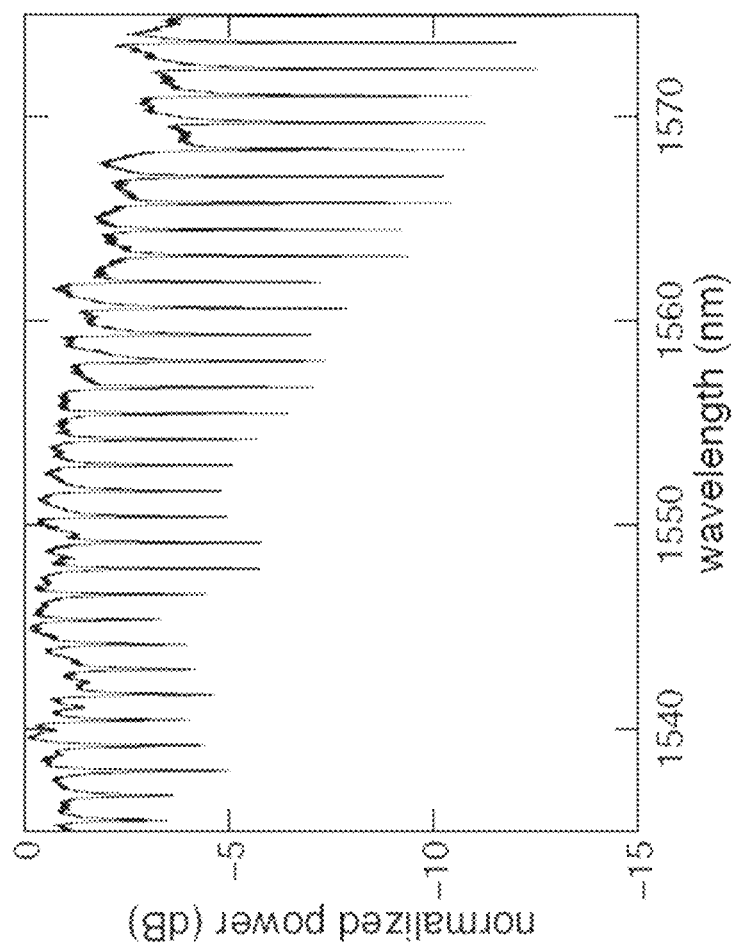
FIG. 17 shows a sweep of resonances in an integrated TiO$_2$ ring resonator device.
Figure 18:
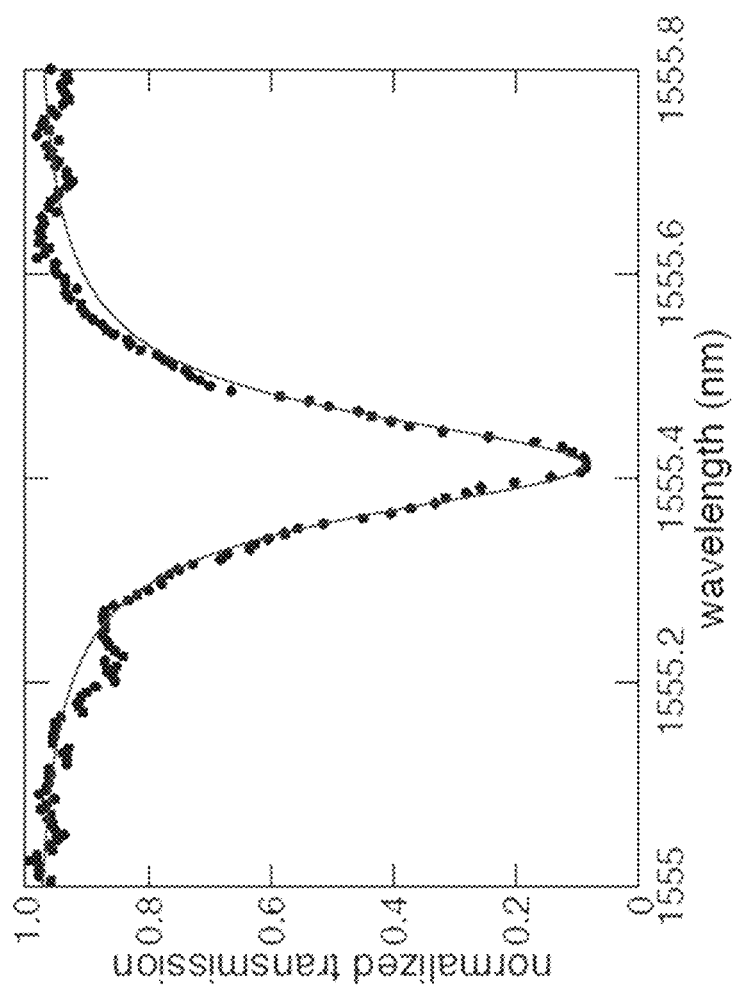
FIG. 18 shows fitting to the normalized transmission of a resonance in FIG. 17.

FIG. 17 shows a sweep of resonances in an integrated TiO$_2$ ring resonator device. Specifically, the plot shows normalized transmitted power spectrum of a ring resonator with a diameter of 300 µm. Many dips corresponding to the many resonances available in the ring may be observed, with the highest Q factors at about 20,000. FIG. 18 shows the normalized transmission of one of these resonances yields losses of down to 4 dB/cm.

Various publications referenced herein are incorporated by reference in their entirety.

Those having ordinary skill in the art will appreciate that various changes can be made to the above embodiments without departing from the scope of the invention.

The invention claimed is:

1. A device for generating triplet photons, comprising:
 a substrate exhibiting a linear refractive index equal to or less than about 1.6 for at least one radiation wavelength,
 a waveguide disposed on said substrate and extending from a proximal end adapted to receive laser radiation from a pump source at said wavelength, said waveguide comprising a radiation-propagating material exhibiting a linear refractive index equal to or greater than about 1.8 and a third order non-linear refractive index equal to or greater than about $1\times10^{-19}$ m$^2$/W for said at least one radiation wavelength, said waveguide being configured to provide phase matching between at least one propagating mode of said pump radiation and at least one propagating mode suitable for direct triplet entangled photons generated via nonlinear interaction of the pump radiation with the waveguide, wherein said waveguide has a maximum cross-sectional dimension in a range of about 100 nm to about 2000 nm and a maximum length ($L_{max}$) defined by the following relation:

$$L_{max} = \frac{\ln\left(\frac{\alpha_p}{3\alpha_s}\right)}{\alpha_p - 3\alpha_s},$$

wherein $\alpha_p$ and $\alpha_s$ represent respectively coefficient of absorption plus scattering loss of said waveguide at the pump radiation wavelength and at a wavelength of said at least one propagating mode for the direct triplet entangled photons.

2. The device of claim 1, wherein said waveguide is substantially transparent to radiation having a wavelength in a range of about 400 nm to about 2000 nm.

3. The device of claim 1, wherein said waveguide has a thickness in a range of about 100 nm to about 2000 nm.

4. The device of claim 1, wherein said waveguide comprises a top surface and a bottom surface in contact with the substrate.

5. The device of claim 4, further comprising a top cladding disposed on said top surface of the waveguide.

6. The device of claim 5, wherein said top cladding and said substrate are formed of the same material.

7. The device of claim 5, wherein said top cladding and said substrate are formed of different materials.

8. The device of claim 1, wherein said waveguide has a non-circular cross-section.

9. The device of claim 8, wherein said non-circular cross-section comprises any of a rectangular and trapezoidal cross-section.

10. The device of claim 1, wherein said waveguide is configured to provide a plurality of modes for propagation of said pump laser radiation.

11. The device of claim 10, wherein said waveguide is configured to provide phase matching between a higher propagating mode of said pump radiation and at least one mode suitable for propagation of direct triplet entangled photons generated via nonlinear interaction of the pump radiation with the waveguide.

12. The device of claim 1, wherein said waveguide comprises any of $TiO_2$, silicon nitride, diamond and silicon carbide.

13. The device of claim 1, wherein said substrate comprises any of silica, quartz, aluminum oxide, zinc oxide, sapphire and $MgF_2$.

* * * * *